United States Patent
Ishikawa

(10) Patent No.: US 10,259,299 B2
(45) Date of Patent: Apr. 16, 2019

(54) SLIDING DOOR STRUCTURE

(71) Applicant: TOYOTA JIDOSHA KABUSHIKI KAISHA, Toyota-shi, Aichi-ken (JP)

(72) Inventor: Hironari Ishikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/703,513

(22) Filed: Sep. 13, 2017

(65) Prior Publication Data

US 2018/0126829 A1    May 10, 2018

(30) Foreign Application Priority Data

Nov. 4, 2016    (JP) .................... 2016-216575

(51) Int. Cl.
| | |
|---|---|
| *B60J 5/06* | (2006.01) |
| *B60J 5/04* | (2006.01) |
| *E05D 15/10* | (2006.01) |
| *E05F 15/646* | (2015.01) |

(52) U.S. Cl.
CPC ............. *B60J 5/06* (2013.01); *B60J 5/0468* (2013.01); *E05D 15/101* (2013.01); *E05D 15/1005* (2013.01); *E05F 15/646* (2015.01); *E05D 2015/1026* (2013.01); *E05D 2015/1031* (2013.01); *E05Y 2201/404* (2013.01); *E05Y 2201/654* (2013.01); *E05Y 2900/531* (2013.01)

(58) Field of Classification Search
CPC ... B60J 5/06; B60J 5/047; B60J 5/0479; B60J 5/062; B60J 5/0416; B60J 1/16; B60J 1/17; B60J 5/04; B60J 5/043

USPC .... 296/155, 202, 97.22, 190.11, 156.9, 153; 49/360, 209, 217, 28, 324, 352; 29/426.1, 592, 596
See application file for complete search history.

(56) References Cited

U.S. PATENT DOCUMENTS

| | | | |
|---|---|---|---|
| 7,658,438 B1 * | 2/2010 | Elliott | ............... E05D 15/1081 296/155 |
| 7,887,118 B2 * | 2/2011 | Elliott | ..................... B60J 5/06 296/146.12 |
| 7,918,492 B2 * | 4/2011 | Elliott | ..................... B60J 5/06 296/146.12 |

(Continued)

FOREIGN PATENT DOCUMENTS

| | | |
|---|---|---|
| JP | 2001-317269 A | 11/2001 |
| JP | 2004-175199 A | 6/2004 |
| JP | 2008-024268 A | 2/2008 |

*Primary Examiner* — D Glenn Dayoan
*Assistant Examiner* — Sunsurraye Westbrook
(74) *Attorney, Agent, or Firm* — Oliff PLC

(57) ABSTRACT

A sliding door structure in which a position where a door side end-section of a vehicle body rail support member is coupled to a door main body being further to a door closing direction side than a center-of-gravity position of a door, and a position of a door side end-section of a door rail support member in a fully open state being further to a door closing direction side than the center-of-gravity position of the door and further to a door opening direction side than a position where the door side end-section of the vehicle body rail support member is coupled to the door main body, and that further includes: an inclination suppressing wall provided at a vehicle body and configured so as to be abutted, from a vehicle lower side, by a reaction force generating section at least in the fully open state.

6 Claims, 19 Drawing Sheets

(56) References Cited

U.S. PATENT DOCUMENTS 8,152,221 B2 * 4/2012 Yoshioka .................. B60J 5/06
296/155

* cited by examiner

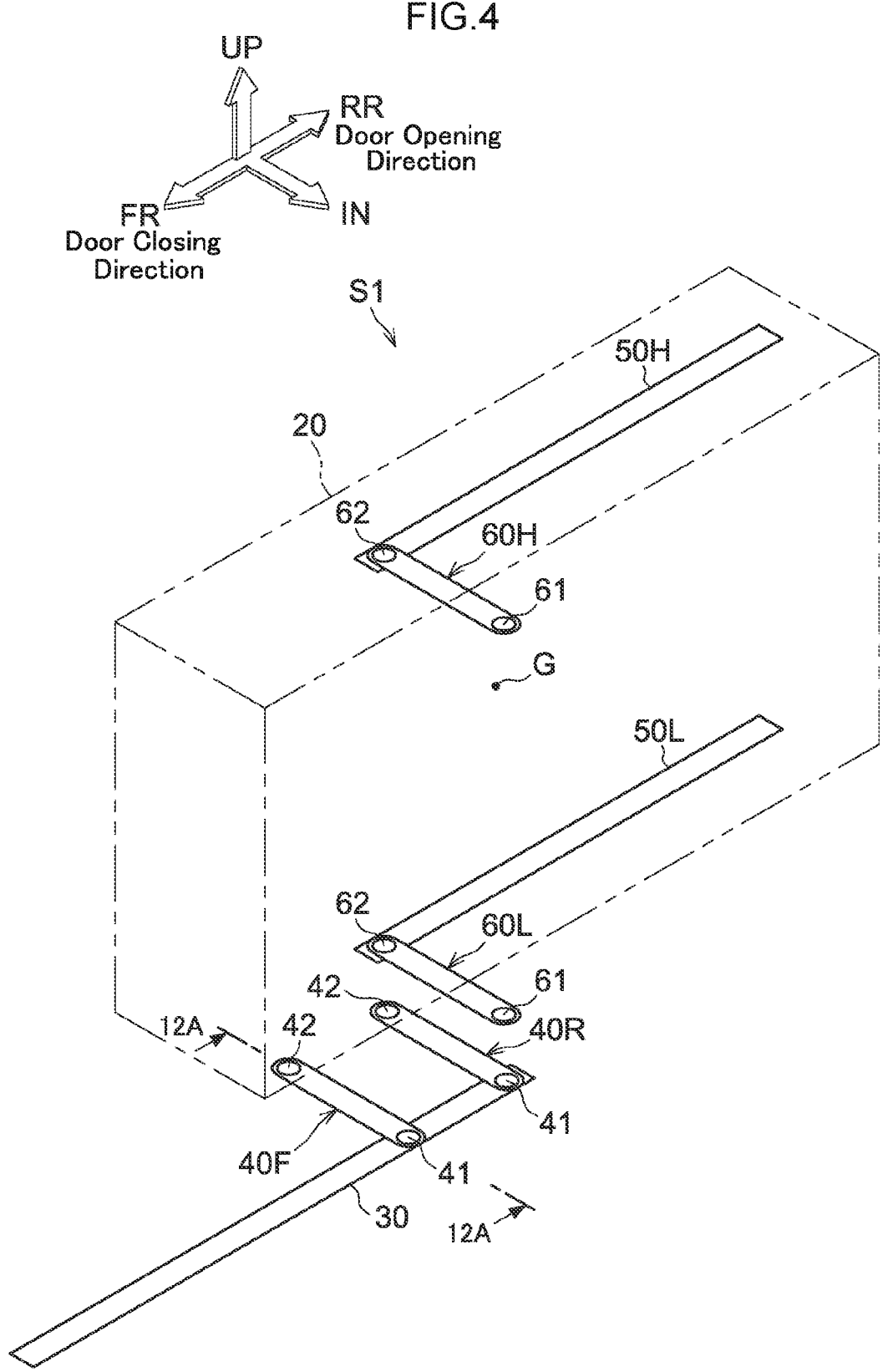

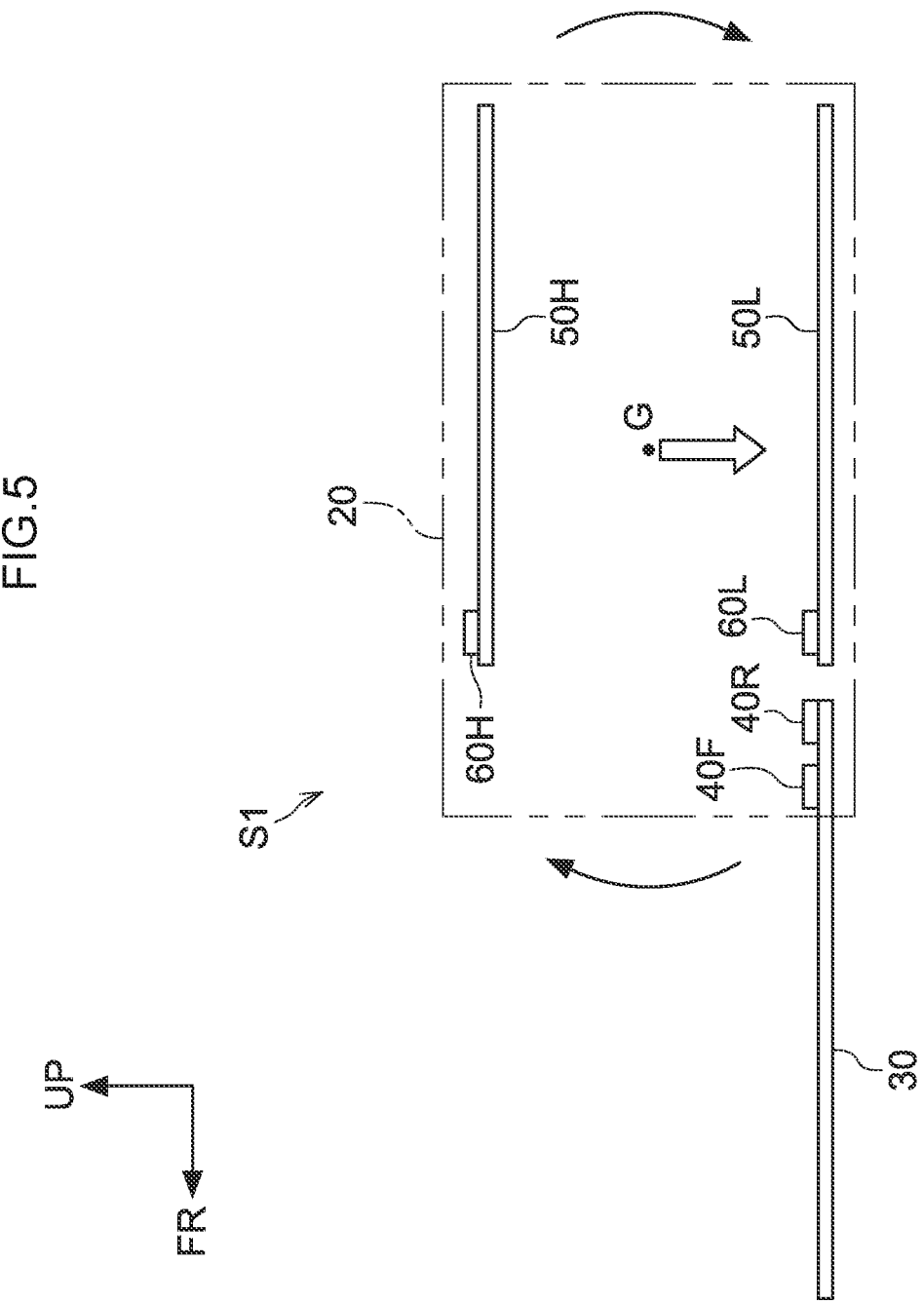

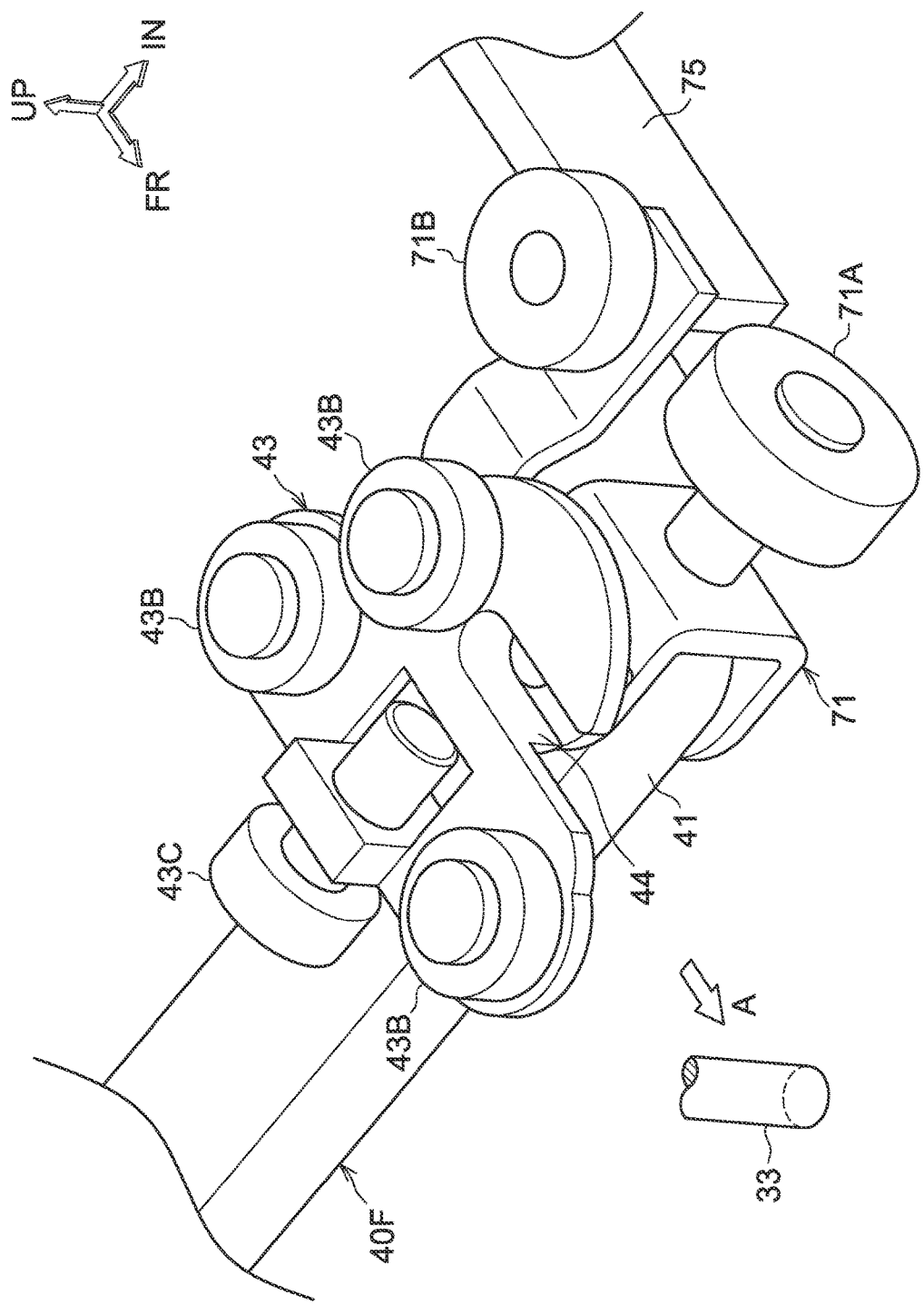

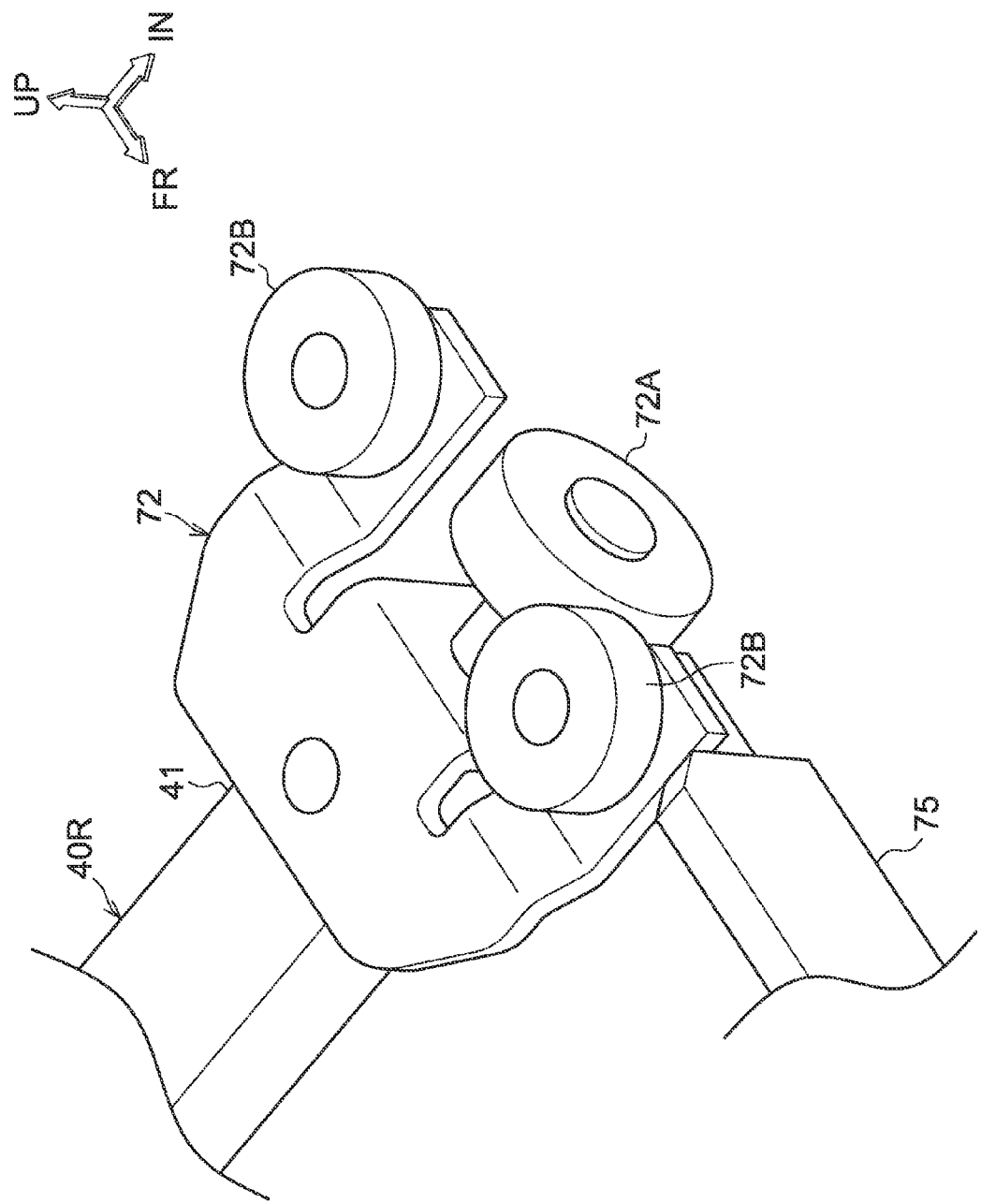

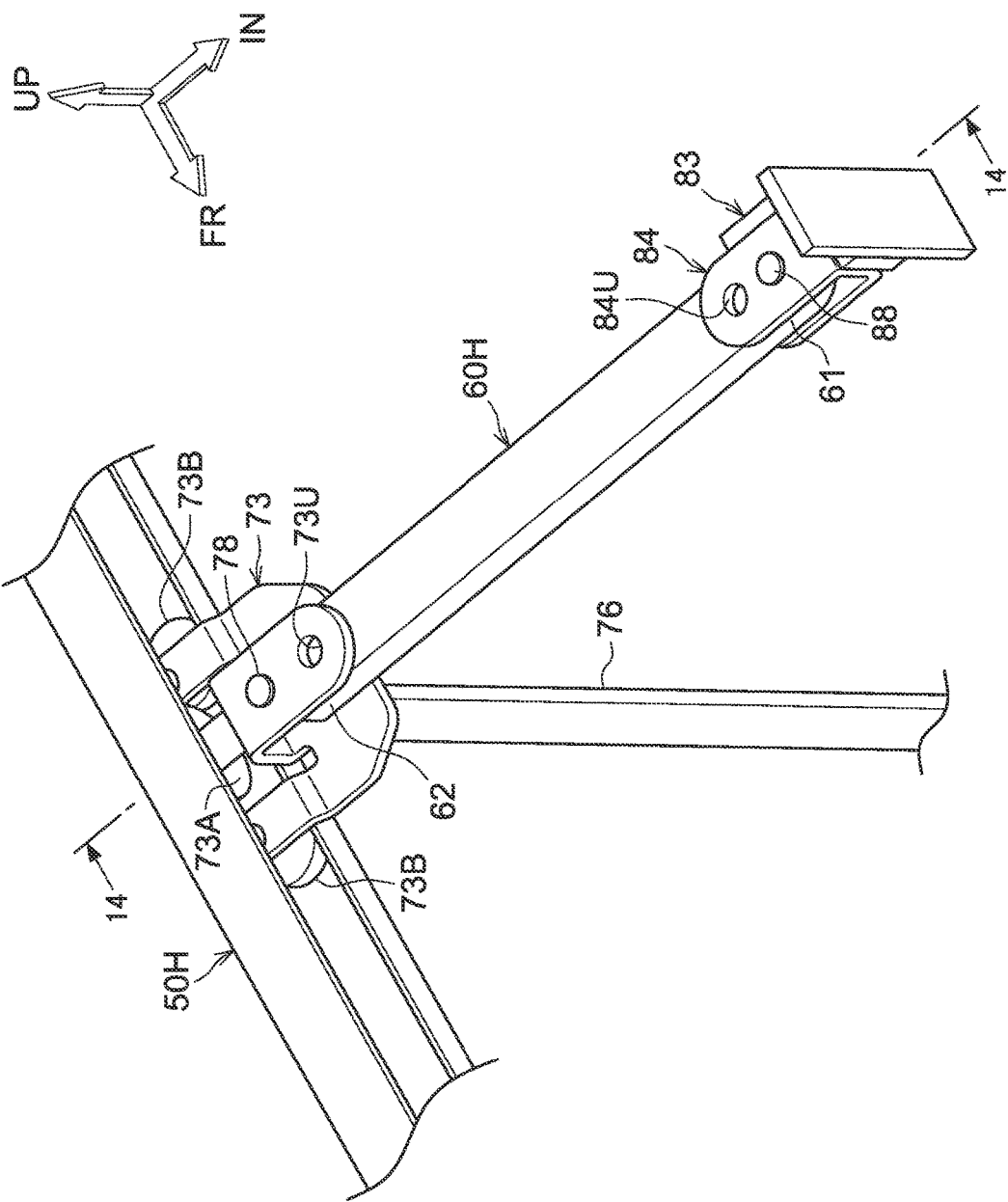

SLIDING DOOR STRUCTURE

CROSS-REFERENCE TO RELATED APPLICATION

This application is based on and claims priority under 35 U.S.C. 119 from Japanese Patent Application No. 2016-216575 filed on Nov. 4, 2016, which is incorporated by reference herein.

BACKGROUND

Technical Field

The present disclosure relates to a sliding door structure.

Related Art

Japanese Patent Application Laid-Open Publication No. 2004-175199 discloses a sliding door structure. In this sliding door structure, a slide rail extending in a vehicle front-rear direction is provided in a lower section of a door opening of a vehicle body, and a sliding member is provided so as to slide along this slide rail. Moreover, a coupling link is attached freely rotatably to the sliding member, and a first extended-out section of a pair of extended-out sections configuring the coupling link is coupled to a sliding door.

In addition, a second extended-out section of the pair of extended-out sections configuring the coupling link is provided so as to slide along a guide rail provided in the vehicle body, and an end section to a vehicle front of the guide rail is curved toward an inner side in a vehicle width direction. This results in a configuration that when the sliding door is slid to the vehicle front, the coupling link rotates and the sliding door moves in a direction of approaching the vehicle body.

Moreover, a guide rail extending toward a vehicle rear from a rear section of the door opening of the vehicle body is separately provided, and the sliding door is supported by the vehicle body by a rear slide support section configured including this guide rail. An end section to the vehicle front of this guide rail is curved toward an inner side in the vehicle width direction.

If the guide rail of the rear slide support section can be provided on a door side, a channel in a middle section in a vehicle up-down direction in a side section of the vehicle body can be got rid of, and design characteristics improve. However, in the above-described technology, upon considering the case where hypothetically the guide rail of the rear slide support section has been provided on the door side, there is found to be a risk that a support point of the sliding door in a state where the sliding door is open ends up inclining to a vehicle front side, and the sliding door ends up inclining.

SUMMARY

In view of the above-described circumstances, the present disclosure has an object of obtaining a sliding door structure in which inclination of a door main body in a fully open state can be suppressed.

A sliding door structure of an aspect includes: a door main body; a vehicle body rail provided along a door opening-closing direction in a vehicle body; a vehicle body rail support member configured including: a vehicle body side end section coupled to the vehicle body rail and movable along the vehicle body rail; and a door side end section coupled to the door main body; a door rail provided along the door opening-closing direction in the door main body; and a door rail support member configured including: a door side end section coupled to the door rail and movable along the door rail; and a vehicle body side end section coupled to the vehicle body, a position where the door side end section of the vehicle body rail support member is coupled to the door main body being more to a door closing direction side than a center-of-gravity position of a door, and a position of the door side end section of the door rail support member in a fully open state being more to the door closing direction side than the center-of-gravity position of the door and more to a door opening direction side than a position where the door side end section of the vehicle body rail support member is coupled to the door main body, and the sliding door structure further including: a reaction force generating section provided in the vehicle body rail support member; and an inclination suppressing wall provided in the vehicle body and configured so as to be abutted on from a vehicle lower side by the reaction force generating section at least in the fully open state.

BRIEF DESCRIPTION OF THE DRAWINGS

FIG. 4 is a schematic perspective view showing a fully open state of the sliding door structure of the embodiment.

FIG. 5 is a side view in which the fully open state shown in FIG. 4 is seen from a vehicle side surface.

FIG. 9 is a perspective view showing, enlarged, a situation of a periphery of a vehicle body side end section of the front side vehicle body rail support member.

FIG. 11 is a perspective view showing, enlarged, a situation of a periphery of a vehicle body side end section of the rear side vehicle body rail support member.

FIG. 13 is a perspective view showing, enlarged, a situation of a periphery of an upper side door rail support member.

DETAILED DESCRIPTION

A sliding door structure S1 according to an embodiment of the present disclosure will be described below using the drawings.

Note that regarding arrows FR, RR, UP, IN appropriately shown in each of the drawings, the arrow FR indicates a vehicle front, the arrow RR indicates a vehicle rear, the arrow UP indicates a vehicle upper side, and the arrow IN indicates an inner side in a vehicle width direction. Moreover, in the description below, when directions of front/rear, up/down, and inner/outer are employed, these are assumed to indicate front/rear in a vehicle front-rear direction, up/down in a vehicle up-down direction, and inner/outer in the vehicle width direction, unless otherwise specifically stated.

Figure 16:
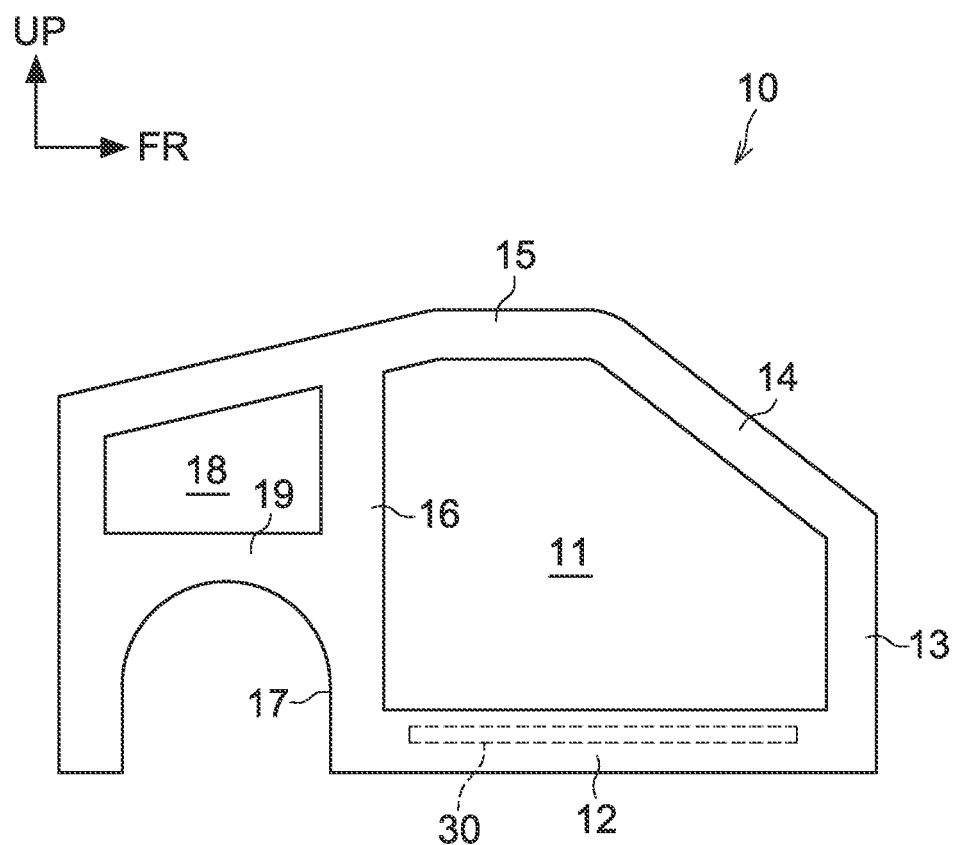
FIG. 16 is a side view in which a vehicle body of the embodiment is seen from a right side surface.

FIG. 16 shows schematically a situation of a vehicle body 10 seen from its right side surface. As shown in FIG. 16, a door opening 11 for an occupant to get in and out is provided in a side surface of the vehicle body 10. A later-described door main body 20 is attached to the vehicle body 10 so as to enable the door opening 11 to be opened/closed. In the present embodiment, the door opening 11 is configured as a large opening provided not only for an occupant of a front seat to get in and out, but also for an occupant of a rear seat to get in and out, and in order to make it possible for this door opening 11 to be opened/closed by one door, the door main body 20 is configured to be large.

A rocker 12 extending in the vehicle front-rear direction is provided on a lower side of the door opening 11. A front pillar lower 13 extending in an up direction from a front end of the rocker 12 is provided on a front side of the door opening 11. A front pillar upper 14 extending obliquely upwards in an up direction and a rear direction is provided from an upper end of the front pillar lower 13. A roof side rail 15 extending in a rear direction is provided from an upper end of the front pillar upper 14. Moreover, a rear pillar 16 extending in an up direction is provided from a rear end of the rocker 12. An upper end of the rear pillar 16 is connected to the roof side rail 15.

A rear wheel house 17 in which a rear tire is disposed is provided on a rear side of the rocker 12. A window section 18 is provided on an upper side of the rear wheel house 17. The window section 18 is disposed rearwards of an upper part of the door opening 11, and the rear wheel house 17 is disposed rearwards of a lower part of the door opening 11. A below-window side section 19 extending in a rear direction from a middle section in an up-down direction of the rear pillar 16 is provided between the rear wheel house 17 and the window section 18.

FIGS. 1 to 4 are perspective views showing schematically the sliding door structure S1.

Figure 1:
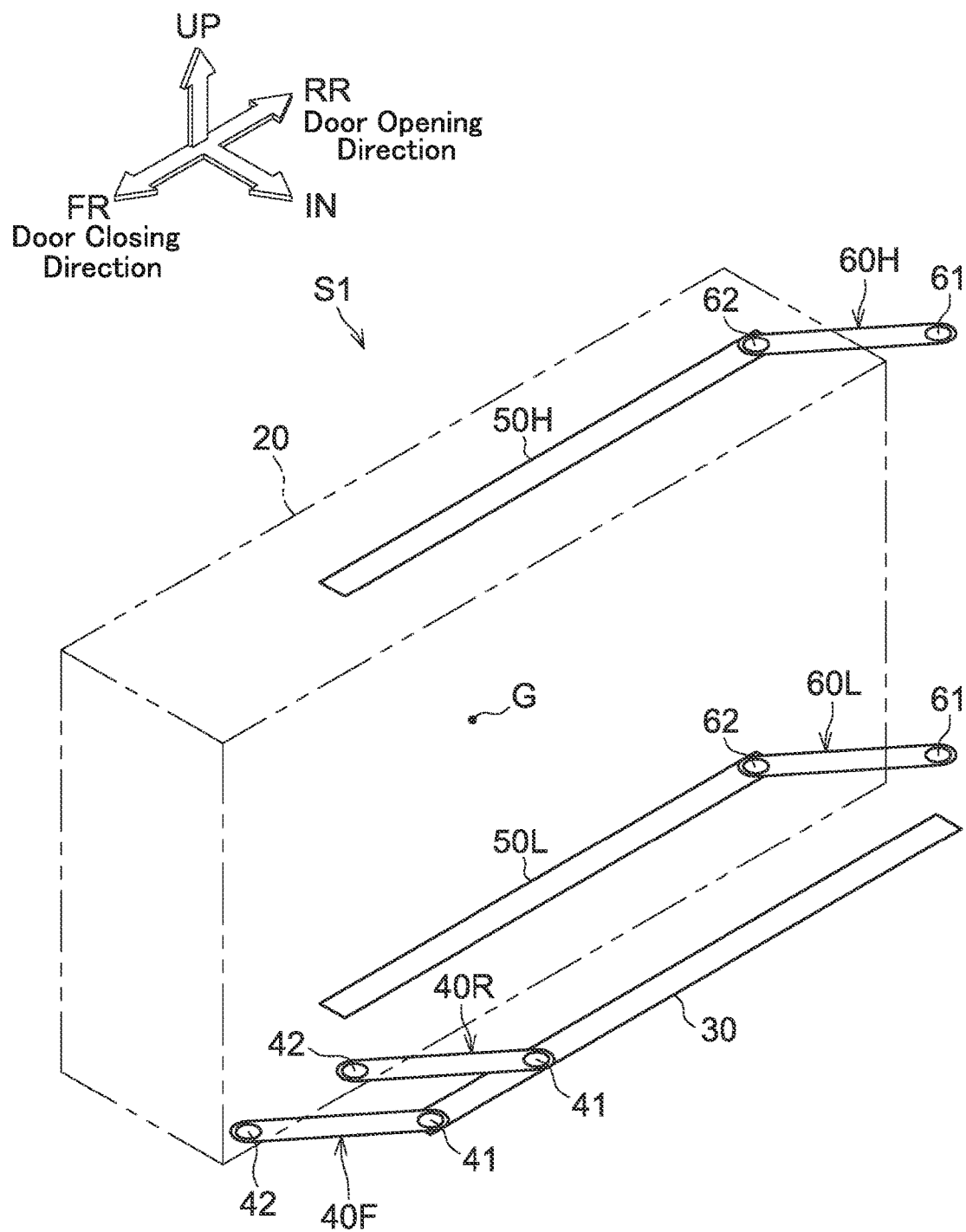
FIG. 1 is a schematic perspective view showing a fully closed state of a sliding door structure of an embodiment.

Note that the door main body 20 illustrated by a two dot-chain line in FIG. 1 is a portion excluding a window section of an entire door covering the door opening 11 of FIG. 16. Therefore, an upper section in the door main body 20 described below corresponds to a vicinity of a beltline of a door.

The sliding door structure S1 of the present embodiment opens by the door main body 20 moving toward a vehicle rear side and closes by the door main body 20 moving toward a vehicle front side. Therefore, in the present embodiment, a vehicle front direction corresponds to a "door closing direction", and a vehicle rear direction corresponds to a "door opening direction".

As shown in these drawings, the sliding door structure S1 is configured including: a vehicle body rail 30; two vehicle body rail support members 40F, 40R; two door rails 50H, 50L; and two door rail support members 60H, 60L.

Note that in the description below, when a vehicle body rail support member of the two vehicle body rail support members 40F, 40R is referred to without it being specified which one it is, it will simply be referred to as a vehicle body rail support member 40. The same applies also to the two door rails 50H, 50L or door rail support members 60H, 60L.

<Vehicle Body Rail>

The vehicle body rail 30 is provided in the vehicle body 10, and, in detail, is provided in the rocker 12 (refer to FIG. 16) configuring the lower side of the door opening 11. The vehicle body rail 30 extends linearly in the vehicle front-rear direction. An extension range in the front-rear direction of the vehicle body rail 30 falls in an extension range in the front-rear direction of the door opening 11.

<Vehicle Body Rail Support Member>

In both of the two vehicle body rail support members 40F, 40R, a vehicle body side end section 41 is coupled to the vehicle body rail 30 and is configured to be movable in the vehicle front-rear direction along the vehicle body rail 30, and a door side end section 42 is coupled to the door main body 20. Moreover, both of the two vehicle body rail support members 40F, 40R are configured to be rotatable with respect to the vehicle body 10 around an axis in an up-down direction centered on the vehicle body side end section 41 and are configured to be rotatable with respect to the door main body 20 around an axis in the up-down direction centered on the door side end section 42.

A position where the door side end section 42 of the vehicle body rail support member on a front side (hereafter, referred to as a "front side vehicle body rail support member") 40F, of the two vehicle body rail support members 40F, 40R is coupled to the door main body 20, is close to a front end of the door main body 20. Moreover, a position where the door side end section 42 of the vehicle body rail support member on a rear side (hereafter, referred to as a "rear side vehicle body rail support member") 40R, of the two vehicle body rail support members 40F, 40R is coupled to the door main body 20, is a position close to a front end of the door main body 20 and more to the rear than the position where the door side end section 42 of the front side vehicle body rail support member 40F is coupled to the door main body 20. The positions where the door side end sections 42 of the two vehicle body rail support members 40F, 40R are coupled to the door main body 20 are both positions more to the front side than a center-of-gravity position G of the door.

Note that the center-of-gravity position G of the door means a center-of-gravity position with respect to the entire door including not only the door main body 20 but also the two door rails 50H, 50L, that is, a center-of-gravity position with respect to an entirety of members supported by the vehicle body 10 via the vehicle body rail support member 40 and the door rail support member 60 (not including the vehicle body rail support member 40 and the door rail support member 60).

<Door Rail>

The two door rails 50H, 50L are both provided in the door main body 20 and both extend linearly in the vehicle front-rear direction. One of the two door rails 50H, 50L is provided close to the beltline which is an upper section of the door main body 20, and the other of the two door rails 50H, 50L is provided in a lower section of the door main body 20 in the same height position as the vehicle body rail 30. The door rail 50 provided in the upper section of the door main body 20 will be referred to as an upper side door rail 50H, and the door rail 50 provided in the lower section of the door main body 20 will be referred to as a lower side door rail 50L.

<Door Rail Support Member>

Of the two door rail support members 60H, 60L, an upper side door rail support member 60H is provided in the upper side door rail 50H, and a lower side door rail support member 60L is provided in the lower side door rail 50L. In both of the two door rail support members 60H, 60L, a vehicle body side end section 61 is coupled to the vehicle body 10, and a door side end section 62 is coupled to the door rail 50 and is configured to be movable in the vehicle front-rear direction along the door rail 50. Moreover, both of the two door rail support members 60H, 60L are configured to be rotatable with respect to the vehicle body 10 around an axis in the up-down direction centered on the vehicle body side end section 61 and are configured to be rotatable with respect to the door main body 20 around an axis in the up-down direction centered on the door side end section 62.

Positions where the vehicle body side end sections 61 of the two door rail support members 60H, 60L are coupled to the vehicle body 10 are both on the rear side of the door opening 11. In detail, the vehicle body side end section 61 of the upper side door rail support member 60H is coupled to a front end section of the below-window side section 19 in a middle section in the up-down direction of the rear pillar 16, and the vehicle body side end section 61 of the lower side door rail support member 60L is coupled to a rear end section of the rocker 12 in a lower end section of the rear pillar 16 (refer to FIG. 16).

Next, basic operations of the sliding door structure S1 will be described.

(Fully Closed State)

Figure 6A:
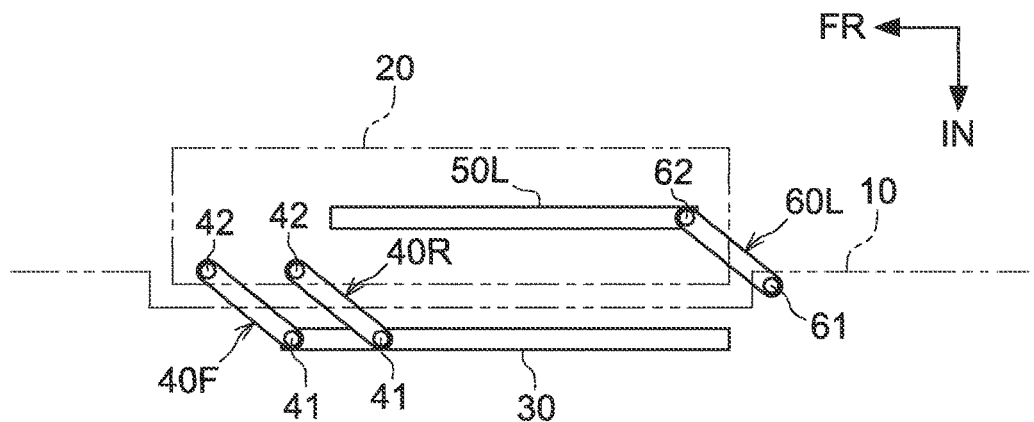
FIG. 6A is a schematic plan view showing a situation of a lower section of the sliding door structure of the embodiment, and shows the fully closed state.
Figure 7A:
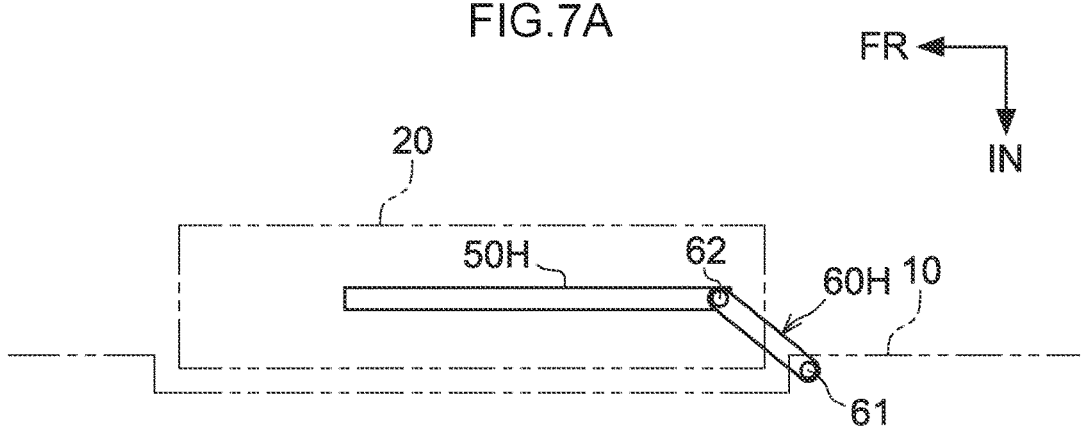
FIG. 7A is a schematic plan view showing a situation of an upper section of the sliding door structure of the embodiment, and shows the fully closed state.

FIGS. 1, 6A, and 7A show a state where the door opening 11 is fully closed by the door main body 20 (hereafter, called a "fully closed state").

As shown in these drawings, in the fully closed state, the vehicle body side end section 41 of the front side vehicle body rail support member 40F is positioned in a front end section of the vehicle body rail 30, and moreover, the door side end section 62 of the upper side door rail support member 60H is positioned in a rear end section of the upper side door rail 50H. In addition, the door side end section 62 of the lower side door rail support member 60L is positioned in a rear end section of the lower side door rail 50L.

Furthermore, in the fully closed state, the two vehicle body rail support members 40 and the two door rail support members 60 are all directed in an oblique direction to the vehicle width direction. In detail, the door side end section 42 of the vehicle body rail support member 40 is positioned more to the vehicle front than the vehicle body side end section 41 of the vehicle body rail support member 40, and moreover, the door side end section 62 of the door rail support member 60 is positioned more to the vehicle front than the vehicle body side end section 61 of the door rail support member 60.

(Boundary State)

Figure 2:
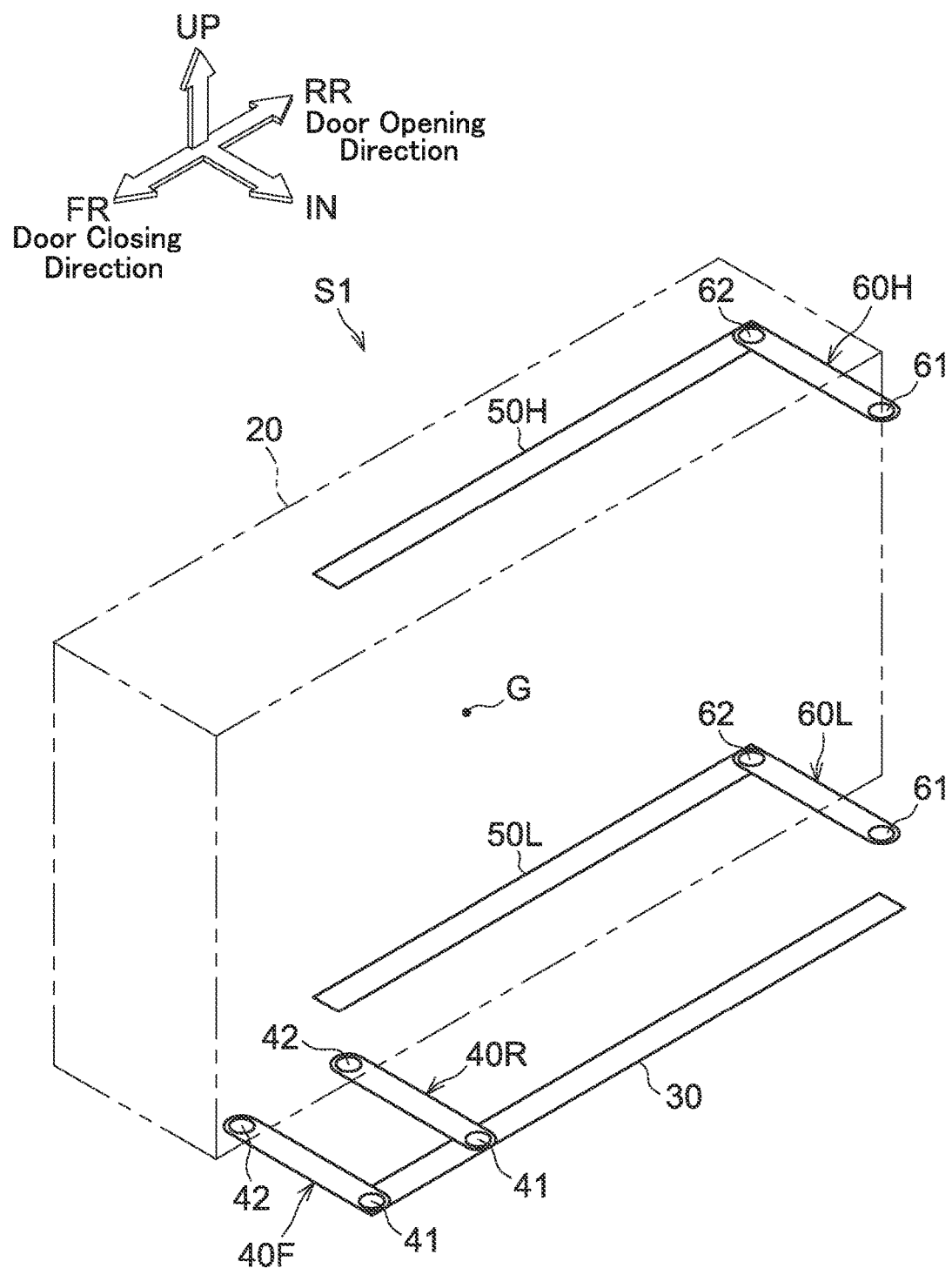
FIG. 2 is a schematic perspective view showing a boundary state of the sliding door structure of the embodiment.
Figure 6B:
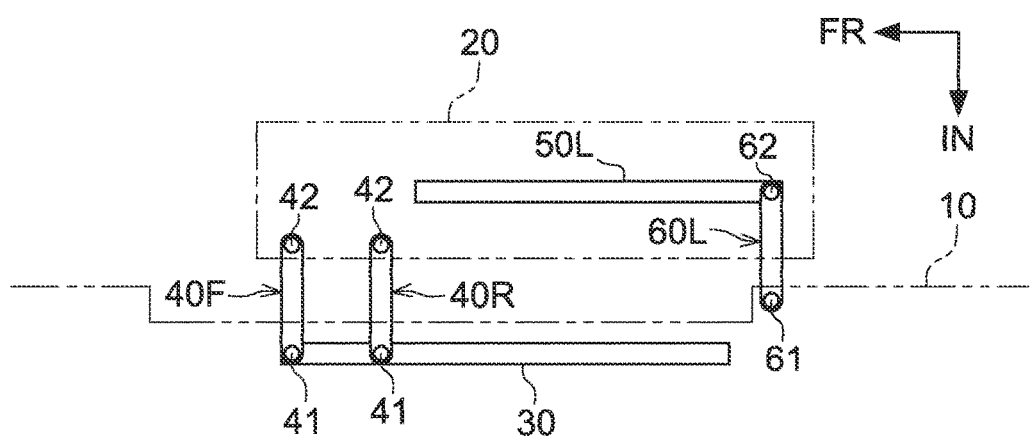
FIG. 6B is a schematic plan view showing a situation of the lower section of the sliding door structure of the embodiment, and shows the boundary state.
Figure 6C:
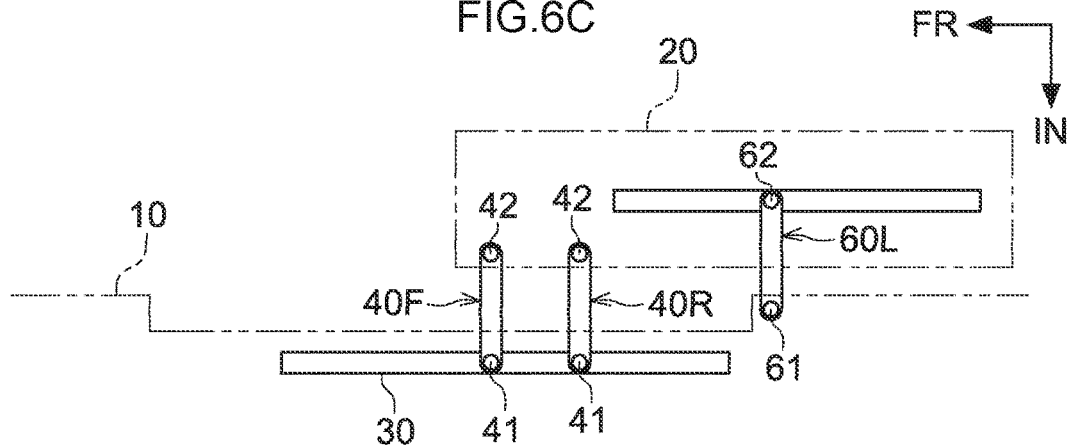
FIG. 6C is a schematic plan view showing a situation of the lower section of the sliding door structure of the embodiment, and shows the sliding operation state.
Figure 7B:
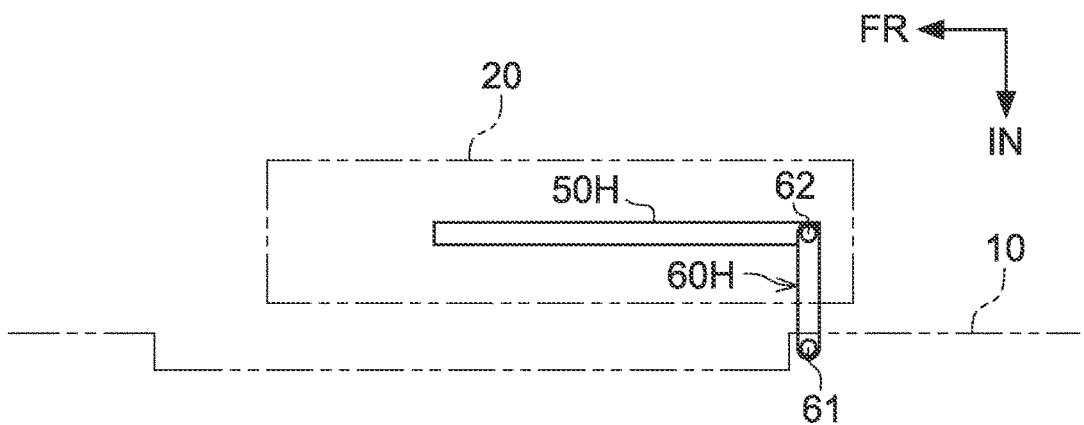
FIG. 7B is a schematic plan view showing a situation of the upper section of the sliding door structure of the embodiment, and shows the boundary state.
Figure 7C:
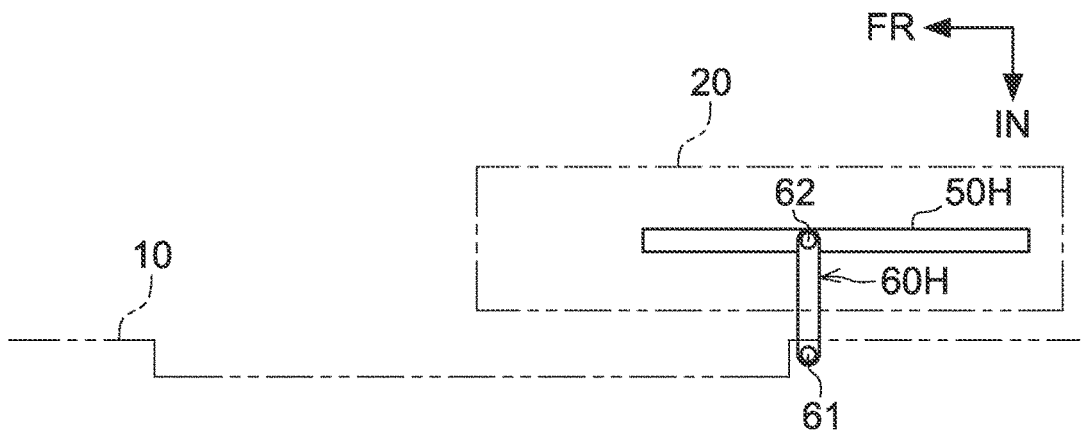
FIG. 7C is a schematic plan view showing a situation of the upper section of the sliding door structure of the embodiment, and shows the sliding operation state.

FIGS. 2, 6B, and 7B show a boundary state.

As shown in these drawings, in the boundary state, similarly to in the fully closed state, the vehicle body side end section 41 of the front side vehicle body rail support member 40F is positioned in the front end section of the vehicle body rail 30, and moreover, the door side end section 62 of the upper side door rail support member 60H is positioned in the rear end section of the upper side door rail 50H. In addition, the door side end section 62 of the lower side door rail support member 60L is positioned in the rear end section of the lower side door rail 50L.

Moreover, in the boundary state, contrary to in the fully closed state, the two vehicle body rail support members 40 and the two door rail support members 60 are all directed in the vehicle width direction. In detail, the door side end section 42 of the vehicle body rail support member 40 has a position in the vehicle front-rear direction that matches that of the vehicle body side end section 41 of the vehicle body rail support member 40, and moreover, the door side end section 62 of the door rail support member 60 has a position in the vehicle front-rear direction that matches that of the vehicle body side end section 61 of the door rail support member 60.

(Swinging Operation: Fully Closed State to Boundary State)

By the vehicle body rail support member 40 and the door rail support member 60 rotating with respect to the vehicle body 10 from the fully closed state shown in FIG. 1, the boundary state shown in FIG. 2 is attained.

That is, the vehicle body rail support member 40 rotates with respect to the vehicle body 10 around the vehicle body side end section 41 of the vehicle body rail support member 40 and the door rail support member 60 rotates with respect to the vehicle body 10 around the vehicle body side end section 61 of the door rail support member 60, without the vehicle body side end section 41 of the vehicle body rail support member 40 making movement along the vehicle body rail 30 and without the door side end section 62 of the door rail support member 60 making movement along the door rail 50. Note that at this time, simultaneously, the vehicle body rail support member 40 rotates with respect to the door main body 20 around the door side end section 42 of the vehicle body rail support member 40 and the door rail support member 60 rotates with respect to the door main body 20 around the door side end section 62 of the door rail support member 60.

This operation from the fully closed state to the boundary state is called a swinging operation, and a state from the fully closed state to the boundary state is called a swinging operation state. Note that the boundary state means a state of a boundary between a state where the door main body 20 is undergoing a swinging operation (swinging operation state) and a state where the door main body 20 is undergoing a later-described sliding operation (sliding operation state).

By undergoing the swinging operation from the fully closed state to the boundary state, the door main body 20 moves so as to describe a circular arc shaped path. As a result, the door main body 20 moves so as to separate to an outer side in the vehicle width direction from the vehicle body 10.

(Fully Open State)

FIGS. 4 and 5 show a fully open state.

As shown in these drawings, in the fully open state, the vehicle body side end section 41 of the rear side vehicle body rail support member 40R is positioned in a rear end section of the vehicle body rail 30, and moreover, the door side end section 62 of the upper side door rail support member 60H is positioned in a front end section of the upper side door rail 50H. In addition, the door side end section 62 of the lower side door rail support member 60L is positioned in a front end section of the lower side door rail 50L.

Moreover, in the fully open state, similarly to in the boundary state, the two vehicle body rail support members 40 and the two door rail support members 60 are all directed in the vehicle width direction. In detail, the door side end section 42 of the vehicle body rail support member 40 has a position in the vehicle front-rear direction that matches that of the vehicle body side end section 41 of the vehicle body rail support member 40, and moreover, the door side end section 62 of the door rail support member 60 has a position in the vehicle front-rear direction that matches that of the vehicle body side end section 61 of the door rail support member 60.

(Sliding Operation: Boundary State to Fully Open State)

Figure 3:
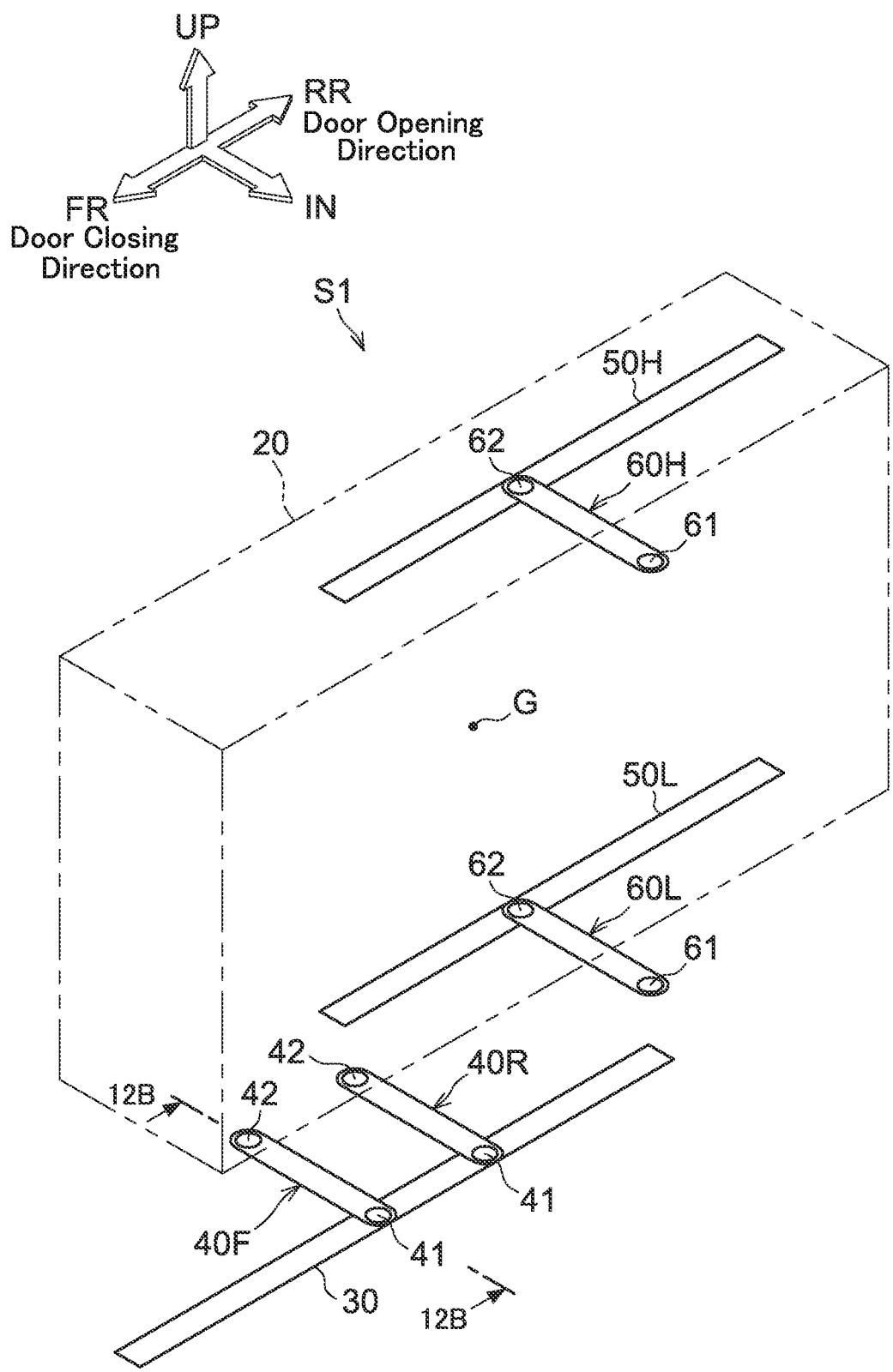
FIG. 3 is a schematic perspective view showing a sliding operation state of the sliding door structure of the embodiment.

By the vehicle body side end section 41 of the vehicle body rail support member 40 moving along the vehicle body rail 30 and the door side end section 62 of the door rail support member 60 moving along the door rail 50 from the boundary state shown in FIG. 2, a state shown in FIG. 3 is passed through, whereby the fully open state shown in FIG. 4 is attained.

That is, the vehicle body side end section 41 of the vehicle body rail support member 40 moves along the vehicle body rail 30 and the door side end section 62 of the door rail support member 60 moves along the door rail 50, without the vehicle body rail support member 40 and the door rail support member 60 rotating with respect to the vehicle body 10 and the door main body 20.

This operation from the boundary state to the fully open state is called the sliding operation, and the state from the boundary state to the fully open state is called the sliding operation state.

The above-described operations of the sliding door structure S1 can be achieved by the likes of a later-described slide restricting mechanism M1, swing restricting mechanism M2, and solenoid type swing restricting mechanism M4, for example.

<Detailed Configuration of Periphery of Vehicle Body Rail Support Member>

Figure 8:
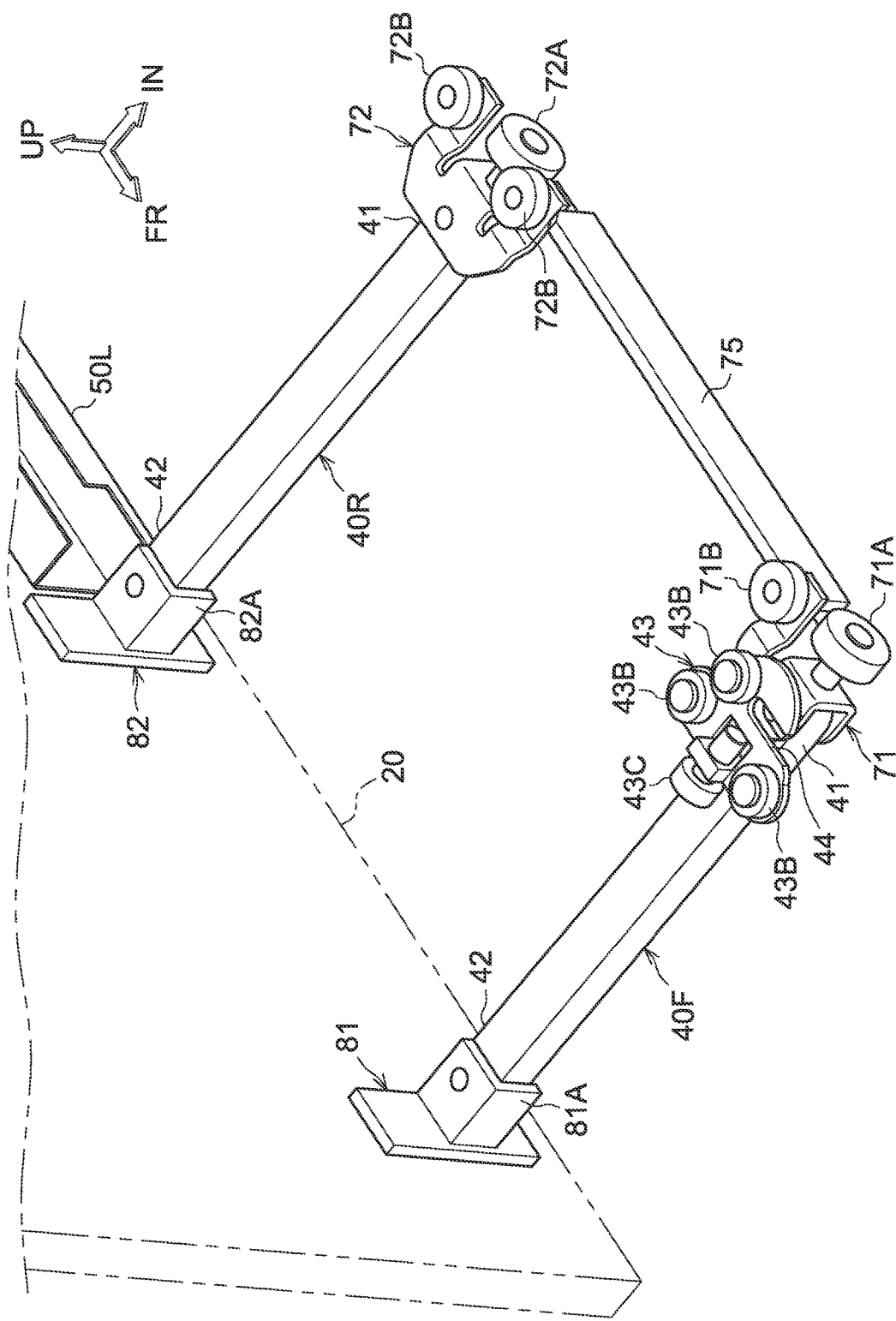
FIG. 8 is a perspective view showing, enlarged, a situation of peripheries of a front side vehicle body rail support member and a rear side vehicle body rail support member.

Next, a detailed configuration of a periphery of the vehicle body rail support member 40 will be described. FIG. 8 shows, enlarged, configurations of peripheries of the front side vehicle body rail support member 40F and the rear side vehicle body rail support member 40R.

As shown in FIG. 8, a front side coupling member 81 is fixed to a vicinity of a front end of the door main body 20. The door side end section 42 of the front side vehicle body rail support member 40F is rotatably connected to the front side coupling member 81. As a result, the door side end section 42 of the front side vehicle body rail support member 40F is coupled to the door main body 20, and the front side vehicle body rail support member 40F is configured to be rotatable with respect to the door main body 20 around the door side end section 42 of the front side vehicle body rail support member 40F, via the front side coupling member 81.

A rear side coupling member 82 is fixed to a vicinity of the front end of the door main body 20 at a position more to a rear side in the vehicle front-rear direction than a position where the front side coupling member 81 is fixed. The door side end section 42 of the rear side vehicle body rail support member 40R is rotatably connected to the rear side coupling member 82. As a result, the door side end section 42 of the rear side vehicle body rail support member 40R is coupled to the door main body 20, and the rear side vehicle body rail support member 40R is configured to be rotatable with respect to the door main body 20 around the door side end section 42 of the rear side vehicle body rail support member 40R, via the rear side coupling member 82.

The front side coupling member 81 and the rear side coupling member 82 are configured including, respectively, front walls 81A, 82A. In a state shown in FIG. 8, the front side vehicle body rail support member 40F and the rear side vehicle body rail support member 40R are both directed in the vehicle width direction, and in this state, the front side vehicle body rail support member 40F contacts the front wall 81A, and the rear side vehicle body rail support member 40R contacts the front wall 82A. As a result, rotating angle ranges of the vehicle body rail support members 40F, 40R with respect to the door main body 20 are limited.

(Vehicle Body Rail Sliding Member)

A front side vehicle body rail sliding member 71 is rotatably attached to the vehicle body side end section 41 of the front side vehicle body rail support member 40F, and the front side vehicle body rail support member 40F is configured to be rotatable around an axis in the vehicle up-down direction with respect to the front side vehicle body rail sliding member 71.

Figure 12A:
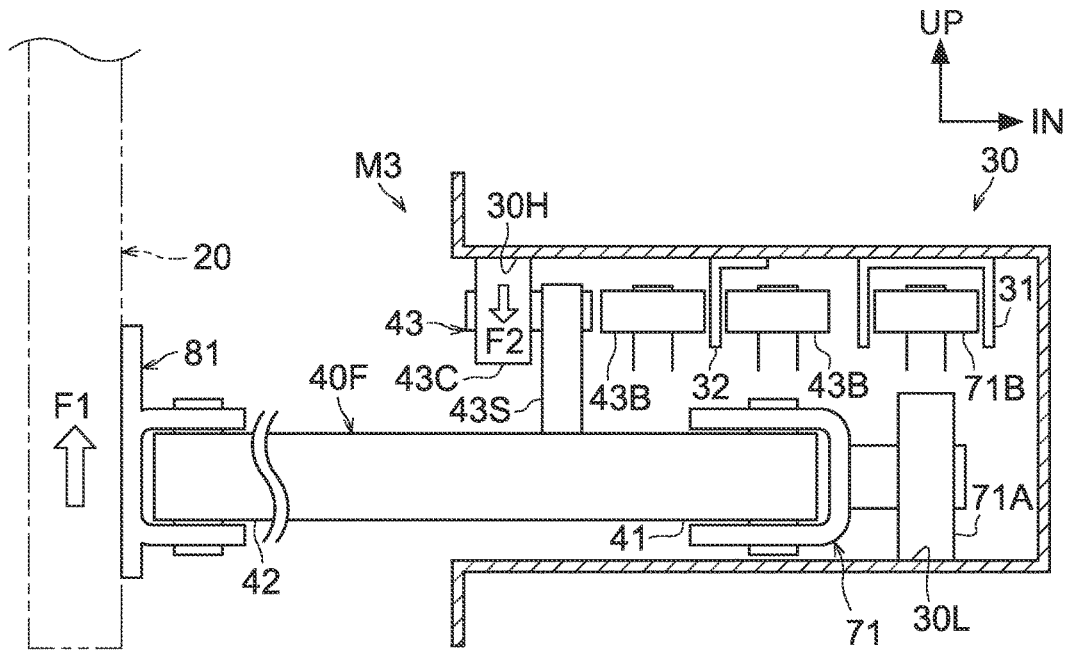
FIG. 12A is an enlarged front view in which a situation of the periphery of the front side vehicle body rail support member is seen from a vehicle front.
Figure 12B:
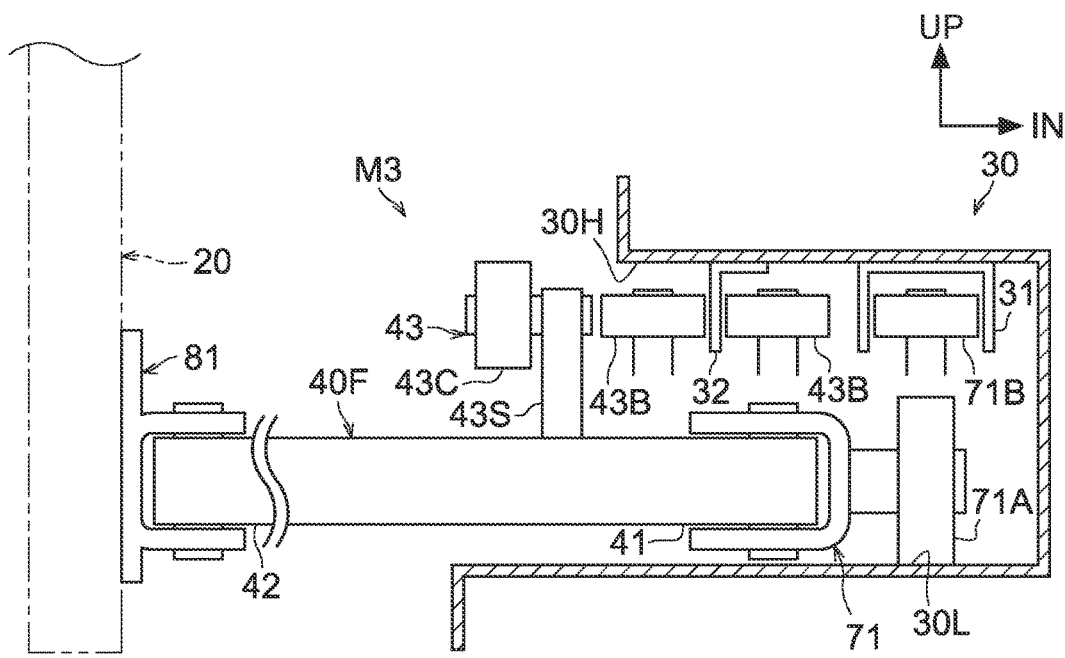
FIG. 12B is an enlarged front view in which a situation of the periphery of the front side vehicle body rail support member is seen from the vehicle front.

The front side vehicle body rail sliding member 71 includes: one horizontal axis roller 71A having as its axial direction the vehicle width direction; and one vertical axis roller 71B having as its axial direction the up-down direction. As shown in FIGS. 12A and 12B, the horizontal axis roller 71A is disposed so as to contact from the vehicle upper side a lower wall 30L of the vehicle body rail 30, and the vertical axis roller 71B is disposed in a channel type rail 31 having a channel shape open to the vehicle lower side. The channel type rail 31 extends linearly in the vehicle front-rear direction, and configures part of the vehicle body rail 30. As a result, the front side vehicle body rail sliding member 71 is configured capable of moving in the vehicle front-rear direction along the vehicle body rail 30.

Therefore, the vehicle body side end section 41 of the front side vehicle body rail support member 40F is coupled to the vehicle body rail 30 and is configured capable of moving along the vehicle body rail 30, via the front side vehicle body rail sliding member 71. Moreover, the front side vehicle body rail support member 40F is configured to be rotatable with respect to the vehicle body 10 around the vehicle body side end section 41 of the front side vehicle body rail support member 40F.

A rear side vehicle body rail sliding member 72 is rotatably attached to the vehicle body side end section 41 of the rear side vehicle body rail support member 40R, and the rear side vehicle body rail support member 40R is configured to be rotatable around an axis in the vehicle up-down direction with respect to the rear side vehicle body rail sliding member 72.

The rear side vehicle body rail sliding member 72 includes: one horizontal axis roller 72A having as its axial direction the vehicle width direction; and two vertical axis rollers 72B having as their axial directions the up-down direction. The horizontal axis roller 72A is disposed so as to contact from the vehicle upper side the lower wall 30L (refer to FIGS. 12A and 12B) of the vehicle body rail 30, and the two vertical axis rollers 72B are disposed in the channel type rail 31. As a result, the rear side vehicle body rail sliding member 72 is configured capable of moving in the vehicle front-rear direction along the vehicle body rail 30. Moreover, the rear side vehicle body rail sliding member 72 is configured so as to move with its orientation with respect to the vehicle body rail 30 held unchanged when moving along the vehicle body rail 30.

Therefore, the vehicle body side end section 41 of the rear side vehicle body rail support member 40R is coupled to the vehicle body rail 30 and is configured capable of moving along the vehicle body rail 30, via the rear side vehicle body rail sliding member 72. Moreover, the rear side vehicle body rail support member 40R is configured to be rotatable with respect to the vehicle body 10 around the vehicle body side end section 41 of the rear side vehicle body rail support member 40R.

Moreover, a front-rear coupling member 75 is provided so as to couple the front side vehicle body rail sliding member 71 and the rear side vehicle body rail sliding member 72. As a result, a distance between the front side vehicle body rail sliding member 71 and the rear side vehicle body rail sliding member 72 is configured to be held constant, and the front side vehicle body rail support member 40F and the rear side vehicle body rail support member 40R are configured to always maintain a parallel relationship with each other.

(Additional Member)

As shown in FIG. 9, an additional member 43 is provided on an upper side of the vehicle body side end section 41 of the front side vehicle body rail support member 40F. The additional member 43 is fixed to the front side vehicle body rail support member 40F, and is configured so as to move integrally with the front side vehicle body rail support member 40F. For example, there is a configuration in which when the front side vehicle body rail support member 40F rotates with respect to the front side vehicle body rail sliding member 71, the additional member 43 also rotates with respect to the front side vehicle body rail sliding member 71.

The additional member 43 includes an opening 44. In a state shown in FIG. 9, that is, in a state where a longitudinal direction of the vehicle body rail support member 40 is directed in the vehicle width direction, an opening direction A of the opening 44 is directed to a front side in the vehicle front-rear direction. The opening 44 is a portion penetrated by a later-described column section 33, and by cooperating with the column section 33, serves to restrict movement along the vehicle body rail 30 of the front side vehicle body rail support member 40F. This point will be mentioned later (slide restricting mechanism M1).

Moreover, the additional member 43 includes three vertical axis rollers 43B having as their axial directions the up-down direction acting as a "rotation restricting rail abutting section", and the three vertical axis rollers 43B, by cooperating with a later-mentioned rotation restricting rail 32 (refer to FIG. 10), serve to restrict rotation with respect to the vehicle body 10 of the front side vehicle body rail support member 40F. This point will be mentioned later (swing restricting mechanism M2).

Moreover, the additional member 43 includes a horizontal axis roller 43C acting as a "reaction force generating section". The horizontal axis roller 43C is a roller having as its axial direction a direction parallel to the longitudinal direction of the front side vehicle body rail support member 40F, and by cooperating with a later-mentioned upper wall 30H (refer to FIGS. 12A and 12B) of the vehicle body rail 30, serves to suppress inclination of the door main body 20 in the fully open state (inclination suppressing mechanism M3).

<Slide Restricting Mechanism and Swing Restricting Mechanism>

Next, the slide restricting mechanism M1 and the swing restricting mechanism M2 will be described using FIGS. 10A to 10C.

The slide restricting mechanism M1 is configured including: the column section 33 provided in the vehicle body 10; and the opening 44 provided in the additional member 43 fixed to the vehicle body side end section 41 of the front side vehicle body rail support member 40F.

The column section 33 is configured in a circular column shape having its axial direction directed in the vehicle up-down direction, and is provided so as to project toward a vehicle lower side (refer to FIG. 9). A position where the column section 33 is provided is the front end section of the vehicle body rail 30, and a position of the column section 33 with respect to the vehicle body 10 and the vehicle body rail 30 is fixed.

The opening 44 is provided so as to open in one direction, and its opening direction A (refer to arrow A of FIG. 10) is configured as a direction perpendicular to the longitudinal direction of the front side vehicle body rail support member 40F.

Figure 10A:
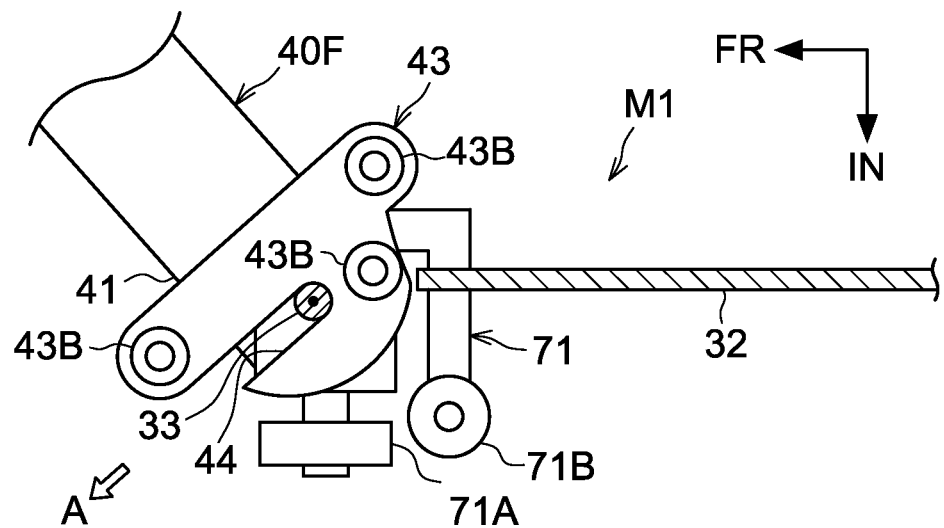
FIG. 10A is a plan view showing a slide restricting mechanism and a swing restricting mechanism, and shows the fully closed state.

FIG. 10A shows the fully closed state. In the fully closed state, the column section 33 penetrates to a back of the opening 44 of the additional member 43. As a result, a central axis of the column section 33 and a central axis of rotation with respect to the front side vehicle body rail sliding member 71 of the front side vehicle body rail support member 40F match. Moreover, the opening direction A of the opening 44 is directed in a direction inclined to an inner side in the vehicle width direction with respect to the vehicle front direction.

Therefore, in the fully closed state, the front side vehicle body rail support member 40F is configured capable of rotating with respect to the front side vehicle body rail sliding member 71, unchanged from a state of the column section 33 penetrating to the back of the opening 44 of the additional member 43. On the other hand, in the fully closed state, the front side vehicle body rail sliding member 71 has its movement along the vehicle body rail 30 restricted.

The latter will be described in detail.

As shown in FIG. 10A, in the fully closed state, even if the front side vehicle body rail sliding member 71 attempts to move in the vehicle rear direction along the vehicle body rail 30, the additional member 43 receives a reaction force to the vehicle front direction from the column section 33 penetrating the opening 44, whereby the front side vehicle body rail sliding member 71 is prevented from moving in the vehicle rear direction.

Moreover, even if the front side vehicle body rail sliding member 71 attempts to move in the vehicle front direction along the vehicle body rail 30, the front side vehicle body rail sliding member 71 is prevented from moving in the vehicle front direction, similarly to as mentioned above.

As described above, in the fully closed state, movement along the vehicle body rail 30 of the front side vehicle body rail sliding member 71 is restricted, and as a result, the vehicle body side end section 41 of the vehicle body rail support member 40F is restricted from moving along the vehicle body rail 30.

Moreover, as may also be understood from the above description, the front side vehicle body rail sliding member 71 is restricted from moving along the vehicle body rail 30 not only in the fully closed state, but up until the opening direction A is directed in the vehicle front direction.

Figure 10B:
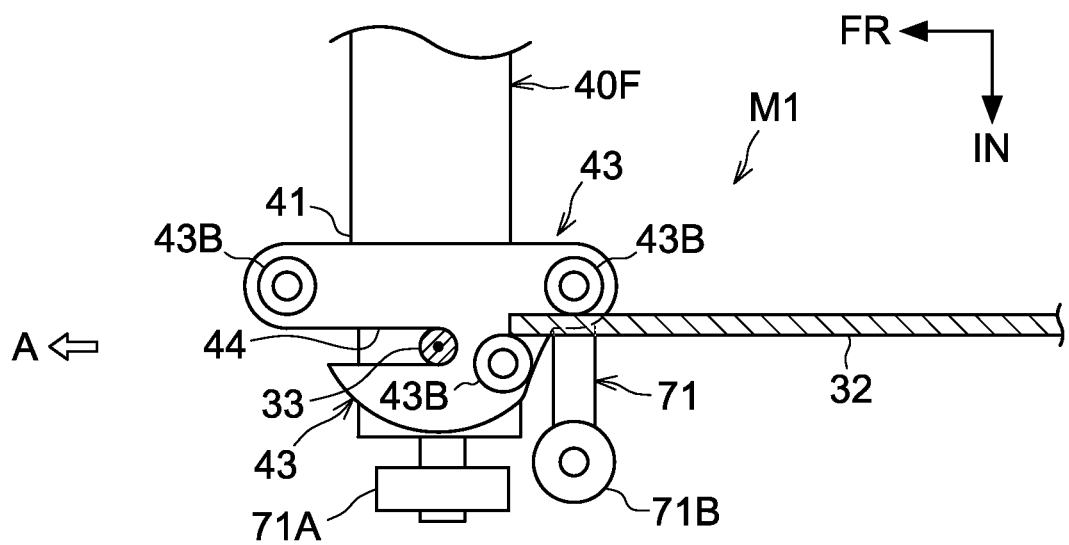
FIG. 10B is a plan view showing the slide restricting mechanism and the swing restricting mechanism, and shows the boundary state.

FIG. 10B shows the boundary state (state corresponding to FIG. 2).

By the front side vehicle body rail support member 40F rotating with respect to the front side vehicle body rail sliding member 71 from the fully closed state shown in FIG. 10A, the boundary state shown in FIG. 10B is attained.

In the boundary state, the opening direction A of the opening 44 is directed to the vehicle front. As a result, when the front side vehicle body rail sliding member 71 attempts to move in the vehicle rear direction along the vehicle body rail 30, the additional member 43 does not receive a reaction force from the column section 33 penetrating the opening 44. Therefore, in the boundary state, movement to the vehicle rear along the vehicle body rail 30 of the front side vehicle body rail sliding member 71 is allowed, and as a result, movement in the vehicle rear direction of the vehicle body side end section 41 of the front side vehicle body rail support member 40F is allowed.

Moreover, in the boundary state, when the front side vehicle body rail sliding member 71 attempts to move in the vehicle front direction along the vehicle body rail 30, the additional member 43 receives a reaction force to the vehicle front direction from the column section 33 penetrating the opening 44. Therefore, movement in the vehicle front direction of the front side vehicle body rail sliding member 71 is restricted also in the boundary state.

Moreover, in the boundary state, the one vertical axis roller 34B positioned most to the vehicle rear, of the three vertical axis rollers 34B of the additional member 43 contacts the rotation restricting rail 32. Therefore, the rotating angle range of the front side vehicle body rail support member 40F is limited.

Figure 10C:
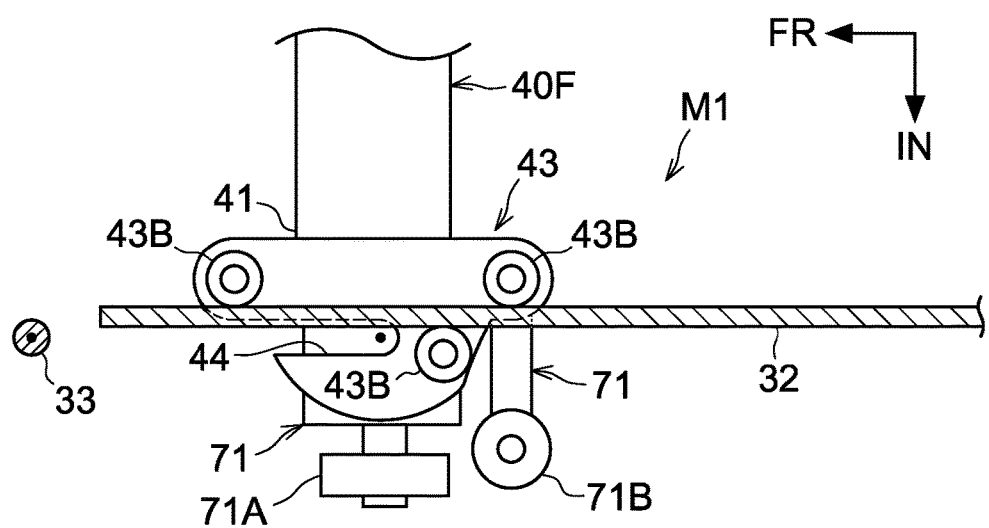
FIG. 10C is a plan view showing the slide restricting mechanism and the swing restricting mechanism, and shows the sliding operation state.

When the front side vehicle body rail sliding member 71 moves in the vehicle rear direction from the boundary state shown in FIG. 10B, a state shown in FIG. 10C is attained. In this state, two vertical axis rollers 43B of the three vertical axis rollers 43B configuring the rotation restricting rail abutting section are positioned on an outer side in the vehicle width direction of the rotation restricting rail 32, and the remaining one vertical axis roller 43B is positioned on an inner side in the vehicle width direction of the rotation restricting rail 32. In this state, even if the front side vehicle body rail support member 40F attempts to rotate with respect to the front side vehicle body rail sliding member 71, the two vertical axis rollers 43B positioned on an outer side in the vehicle width direction of the rotation restricting rail 32 receive a reaction force from the rotation restricting rail 32, whereby rotation of the front side vehicle body rail support member 40F with respect to the front side vehicle body rail sliding member 71 is restricted. That is, the swing restricting mechanism M2 is configured including the three vertical axis rollers 43B and the rotation restricting rail 32, and the sliding operation state of the door main body 20 is achieved by the swing restricting mechanism M2.

<Inclination Suppressing Mechanism>

Next, the inclination suppressing mechanism M3 will be described using FIGS. 12A and 12B.

FIGS. 12A and 12B show a situation of a periphery of the front side vehicle body rail support member 40F seen from the vehicle front side.

As mentioned above, the additional member 43 fixed to the vehicle body side end section 41 of the front side vehicle body rail support member 40F includes the horizontal axis roller 43C acting as the "reaction force generating section". The horizontal axis roller 43C is attached to a support column section 43S provided, projecting upwardly, more to a door main body 20 side than a center of rotation with respect to the front side vehicle body rail sliding member 71 in the front side vehicle body rail support member 40F.

As shown in FIG. 12A, the horizontal axis roller 43C is configured to contact from the vehicle lower side the upper wall 30H acting as an "inclination suppressing wall" of the vehicle body rail 30. By the horizontal axis roller 43C contacting from the vehicle lower side the upper wall 30H of the vehicle body rail 30, the horizontal axis roller 43C receives a force in the vehicle downward direction (refer to arrow F2) from the vehicle body rail 30. Therefore, even in the case that a force acts such that the door side end section 42 of the front side vehicle body rail support member 40F moves upwardly (refer to arrow F1), a reaction force (refer to arrow F2) can be generated by the horizontal axis roller 43C contacting the upper wall 30H of the vehicle body rail 30.

Moreover, the upper wall 30H of the vehicle body rail 30 is configured so as to contact the horizontal axis roller 43C in a state where the door side end sections 62 of the door rail support members 60H, 60L are positioned more to the vehicle front side than the center-of-gravity position G of the door, that is, in a state where the front side vehicle body rail sliding member 71 is in a rear section of the vehicle body rail 30. In detail, as shown in FIG. 12B, in a state where the door side end sections 62 of the door rail support members 60H, 60L are not positioned more to the vehicle front side than the center-of-gravity position G of the door (refer to FIG. 3), the upper wall 30H of the vehicle body rail 30 is configured so as not to contact the horizontal axis roller 43C. On the other hand, when the door side end sections 62 of the door rail support members 60H, 60L move to the vehicle front side with respect to the door main body 20 from the state shown in FIG. 3 thereby moving further to the vehicle front side than the center-of-gravity position G, the upper wall 30H of the vehicle body rail 30 is configured so as to contact the horizontal axis roller 43C, similarly to in the fully open state shown in FIG. 12A.

<Specific Configuration of Periphery of Door Rail Support Member>

FIG. 13 shows a situation of a periphery of the upper side door rail support member 60H.

A coupling member 83 is fixed to the vehicle body 10. The vehicle body side end section 61 of the upper side door rail support member 60H is rotatably connected to the coupling member 83. As a result, the vehicle body side end section 61 of the upper side door rail support member 60H is coupled to the vehicle body 10, and the upper side door rail support member 60H is configured to be rotatable about an axis in the vehicle up-down direction with respect to the vehicle body 10 around the vehicle body side end section 61 of the upper side door rail support member 60H, via the coupling member 83.

On the other hand, an upper side door rail sliding member 73 is rotatably attached to the door side end section 62 of the upper side door rail support member 60H, and the upper side door rail support member 60H is configured to be rotatable about an axis in the vehicle up-down direction with respect to the upper side door rail sliding member 73.

The upper side door rail sliding member 73 includes: one horizontal axis roller 73A having as its axial direction the vehicle width direction; and two vertical axis rollers 73B having as their axial directions the up-down direction. The two vertical axis rollers 73B are provided aligned in the vehicle front-rear direction to be disposed in the upper side door rail 50H. As a result, the upper side door rail sliding member 73 is configured capable of moving, with its orientation held unchanged, along the upper side door rail 50H.

Therefore, the door side end section 62 of the upper side door rail support member 60H is coupled to the upper side door rail 50 and is configured capable of moving along the upper side door rail 50, via the upper side door rail sliding member 73. Moreover, the upper side door rail support member 60H is configured to be rotatable with respect to the door main body 20 around the door side end section 62 of the upper side door rail support member 60H.

A structure of a periphery of the lower side door rail support member 60L is also configured as a structure similar to the above-mentioned structure of the periphery of the upper side door rail support member 60H. That is, a lower side door rail sliding member is rotatably attached to the door side end section 62 of the lower side door rail support member 60L, and the lower side door rail support member 60L is configured to be rotatable about an axis in the vehicle up-down direction with respect to the lower side door rail sliding member. The lower side door rail sliding member is configured capable of moving, with its orientation held unchanged, along the lower side door rail 50L.

Moreover, as shown in FIG. 13, an upper end of an up-down coupling member 76 is connected to the upper side door rail sliding member 73. Moreover, the lower side door rail sliding member is connected to a lower end of the up-down coupling member 76. As a result, the door side end section 62 of the upper side door rail support member 60H and the door side end section 62 of the lower side door rail support member 60L are coupled in the up-down direction by the up-down coupling member 76, via the upper side door rail sliding member 73 and the lower side door rail sliding member.

<Solenoid Type Swing Restricting Mechanism>

Next, the solenoid type swing restricting mechanism M4 will be described using FIG. 14.

Figure 14:
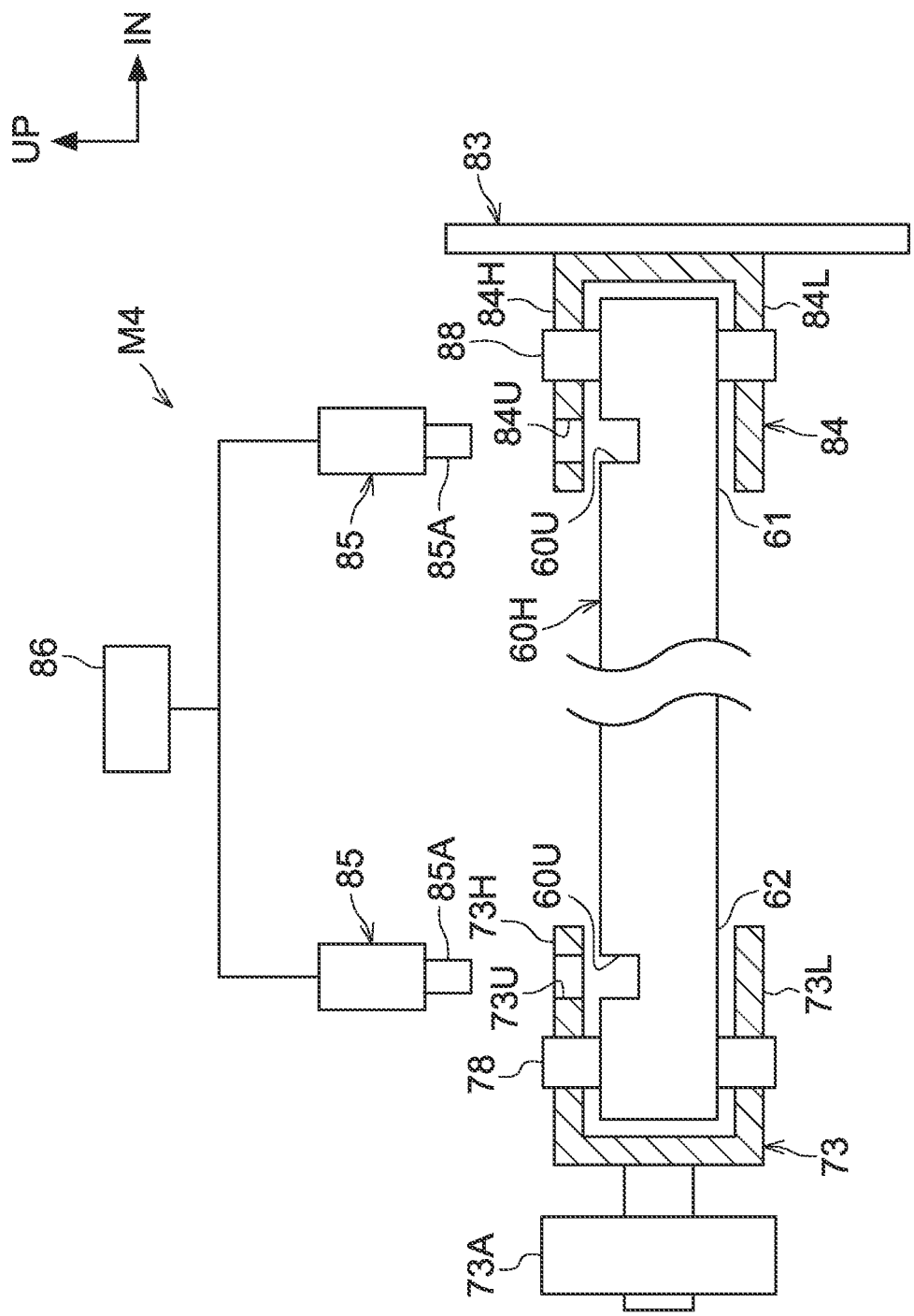
FIG. 14 is a cross-sectional view taken along a longitudinal direction (a cross-sectional view taken along the line 14-14 of FIG. 13) of the upper side door rail support member.

FIG. 14 shows a cross section along a longitudinal direction of the upper side door rail support member 60H.

The coupling member 83 includes a rotation support section 84 that rotatably supports the vehicle body side end section 61 of the upper side door rail support member 60H. The rotation support section 84 is configured substantially in a U shape so as to hold therein from the up-down direction the vehicle body side end section 61 of the upper side door rail support member 60H. A shaft 88 is supported by an upper wall 84H and a lower wall 84L of the rotation support section 84, and the upper side door rail support member 60H is rotatably connected via the shaft 88. A plunger passage hole 84U is formed in the upper wall 84H of the rotation support section 84 at a position more to an outer side in the vehicle width direction than a position of the shaft 88. Moreover, a solenoid 85 is fixed to the upper wall 84H such that a plunger 85A passes through the plunger passage hole 84U (note that for convenience of illustration, FIG. 14 shows a state prior to the solenoid 85 being fixed).

On the other hand, a catch hole 60U is provided, more to a door side end section 62 side than the shaft 88, in the vehicle body side end section 61 of the upper side door rail support member 60H. Moreover, in a state where the longitudinal direction of the upper side door rail support member 60H is directed in the vehicle width direction, the plunger 85A is configured so as to enter the catch hole 60U by the plunger 85A of the solenoid 85 projecting downwardly. When the plunger 85A is in the catch hole 60U, rotation of the upper side door rail support member 60H with respect to the coupling member 83 is restricted.

In addition, the upper side door rail sliding member 73 is configured substantially in a U shape so as to hold therein from the up-down direction the door side end section 62 of the upper side door rail support member 60H. A shaft 78 is supported by an upper wall 73H and a lower wall 73L of the upper side door rail sliding member 73, and the upper side door rail support member 60H is rotatably connected via the shaft 78. A plunger passage hole 73U is formed in the upper wall 73H of the upper side door rail sliding member 73 at a position more to an inner side in the vehicle width direction than a position of the shaft 78. A solenoid 85 is fixed to the upper wall 73H such that a plunger 85A passes through the plunger passage hole 73U.

On the other hand, a catch hole 60U is provided, more to a vehicle body side end section 61 side than the shaft 78, in the door side end section 62 of the upper side door rail support member 60H. Moreover, in a state where the longitudinal direction of the upper side door rail support member 60H is directed in the vehicle width direction, in other words, in a state where the upper side door rail 50H and the upper side door rail support member 60H are in a perpendicular relationship, the plunger 85A is configured so as to enter the catch hole 60U by the plunger 85A of the solenoid 85 projecting downwardly. When the plunger 85A is in the catch hole 60U, rotation of the upper side door rail support member 60H with respect to the upper side door rail sliding member 73 is restricted.

The two solenoids 85 are configured to be controlled by a control device 86. The control device 86 controls the solenoid 85 based on a position with respect to the upper side door rail 50H of the upper side door rail sliding member 73, for example. In detail, when the upper side door rail sliding member 73 is positioned at a rear end of the door rail 50 (in other words, in the swinging operation state from the fully closed state to the boundary state), the plungers 85A of the two solenoids 85 are withdrawn. On the other hand, when the upper side door rail sliding member 73 is positioned at other than the rear end in the door rail 50, the plungers 85A of the two solenoids 85 are projected.

<Swing/Slide Drive Mechanism>

Next, a swing/slide drive mechanism M5 for achieving the swinging operation and the sliding operation by electric drive, will be described.

As shown in FIGS. 15A to 15D, the swing/slide drive mechanism M5 includes: a vehicle body side winding roller 91; a door side winding roller 92; a first wire 93; a second wire 94; and a motor 95 acting as a "drive device" that inputs a force to the first wire 93 and the second wire 94.

The vehicle body side winding roller 91 is attached to the vehicle body side end section 61 of the upper side door rail support member 60H, and the door side winding roller 92 is attached to the door side end section 62 of the upper side door rail support member 60H.

The first wire 93 has its one end fixed to a front end of the upper side door rail 50H, is wound at its middle section on the door side winding roller 92, and has its another end connected to the motor 95 provided in the vehicle body 10. On the other hand, the second wire 94 has its one end fixed to a rear end of the upper side door rail 50H, is wound at its middle section on the door side winding roller 92, and has its another end connected to the motor 95. The first wire 93 and the second wire 94 are configured so as to intersect in vehicle plan view at portions thereof more to a motor 95 side than portions thereof wound on the door side winding roller 92, and subsequently contact the vehicle body side winding roller 91.

Figure 15A:
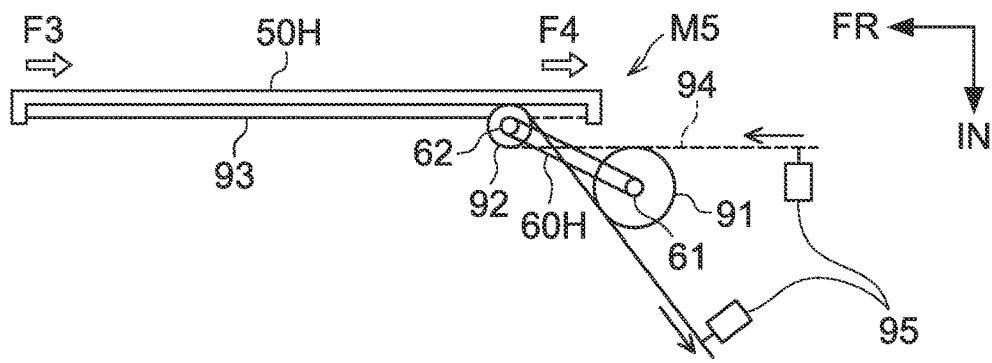
FIG. 15A is a schematic plan view showing operation of a slide/swing drive mechanism, and shows the fully closed state.

In the fully closed state shown in FIG. 15A, a force pulling to the vehicle body side is applied to the first wire 93 and a force pushing from the vehicle body side is applied to the second wire 94, by the motor 95. On doing so, a force to the vehicle rear (refer to arrow F3) is applied to the front end of the upper side door rail 50H via the first wire 93, and a force to the vehicle rear (refer to arrow F4) is applied to the rear end of the upper side door rail 50H via the second wire 94.

Figure 15B:
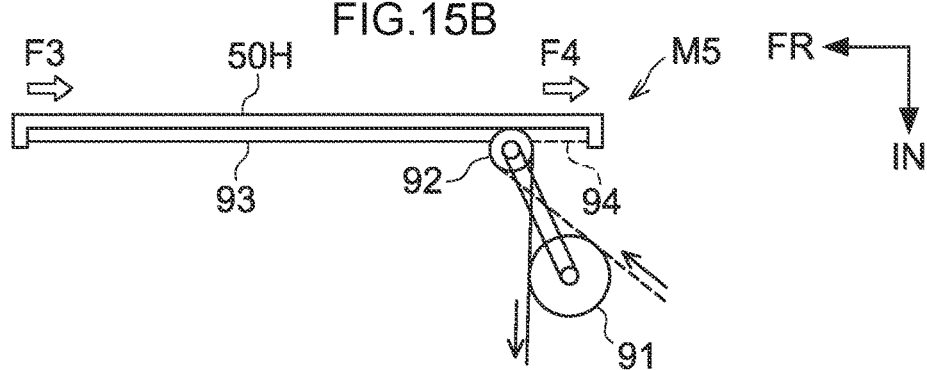
FIG. 15B is a schematic plan view showing operation of the slide/swing drive mechanism, and shows a swinging operation state.

In the fully closed state, the sliding operation is restricted as mentioned above, hence the door main body 20 undergoes the swinging operation as shown in FIG. 15B.

Figure 15C:
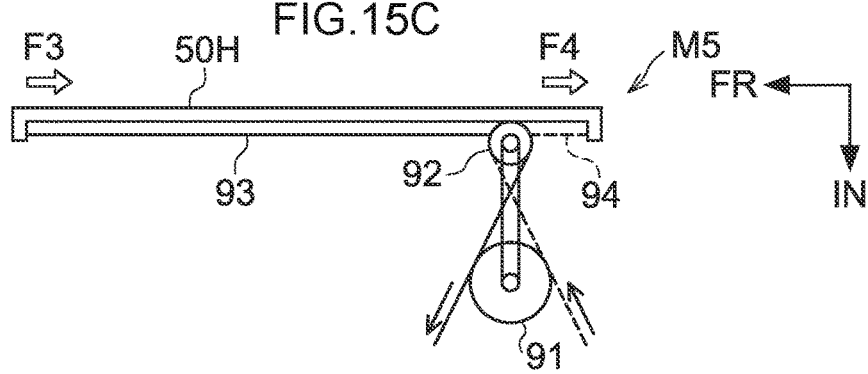
FIG. 15C is a schematic plan view showing operation of the slide/swing drive mechanism, and shows the boundary state.
Figure 15D:
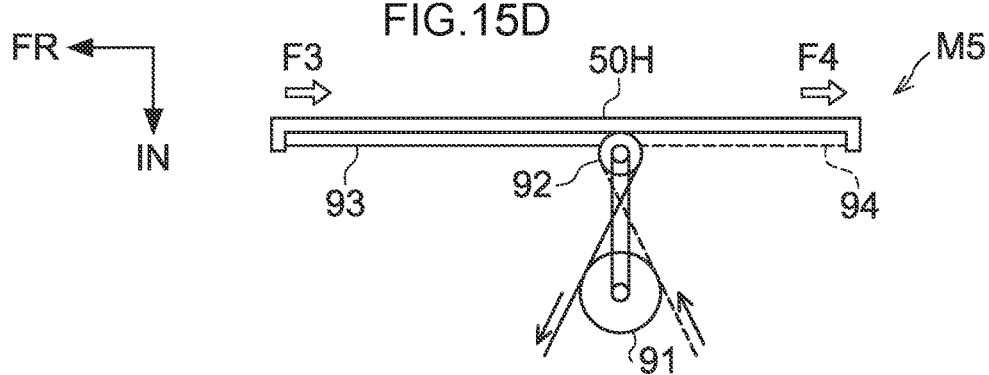
FIG. 15D is a schematic plan view showing operation of the slide/swing drive mechanism, and shows the sliding operation state.

Subsequently, when the boundary state shown in FIG. 15C has been attained, restriction of the sliding operation of the door main body 20 is released. On doing so, the above-mentioned forces via the first wire 93 and the second wire 94 (arrows F3, F4) act as forces causing the door main body 20 to undergo the sliding operation, and the door main body 20 slides to the vehicle rear as shown in FIG. 15D.

Moreover, when closing the sliding door, that is, when setting the sliding door to the fully closed state by passing through the boundary state from the fully open state, forces in an opposite direction to those mentioned above are applied to the first wire 93 and the second wire 94 by the motor 95, whereby the door main body 20 is caused to undergo the sliding operation to the vehicle front, and is then caused to undergo the swinging operation, whereby the sliding door can be set to the fully closed state.

<Actions and Effects>

Next, actions and effects of the sliding door structure 51 of the present embodiment will be described.

In the sliding door structure S1 of the present embodiment, as shown in FIGS. 1 to 4, the vehicle body rail 30 is provided in the vehicle body 10, and the vehicle body side end section 41 of the vehicle body rail support member 40 is coupled to the vehicle body rail 30. Moreover, the door side end section 42 of the vehicle body rail support member 40 is coupled to the door main body 20. In addition, the door rail 50 is provided in the door main body 20, and the door side end section 62 of the door rail support member 60 is coupled to the door rail 50. Moreover, the vehicle body side end section 61 of the door rail support member 60 is coupled to the vehicle body 10. As a result, the door main body 20 is supported by the vehicle body 10.

In addition, the vehicle body side end section 41 of the vehicle body rail support member 40 is movable along the vehicle body rail 30, the door side end section 62 of the door rail support member 60 is movable along the door rail 50, and the vehicle body rail 30 and the door rail 50 both extend linearly in the vehicle front-rear direction which is a door opening-closing direction. As a result, the door main body 20 is configured capable of sliding in the door opening-closing direction (vehicle front-rear direction) with respect to the vehicle body 10.

In addition, the vehicle body rail support member 40 is rotatable with respect to the vehicle body 10 around the vehicle body side end section 41 and rotatable with respect to the door main body 20 around the door side end section 42, and the door rail support member 60 is rotatable with respect to the door main body 20 around the door side end section 62 and rotatable with respect to the vehicle body 10 around the vehicle body side end section 61. As a result, the door main body 20 is configured capable of swinging so as to separate from the vehicle body 10, and moreover, the door main body 20 is configured capable of swinging so as to approach the vehicle body 10.

In the sliding door structure S1 of the present embodiment, due to there being the above kind of configuration, it is possible to improve degree of freedom of design of the vehicle body 10 while keeping stability of support of the door main body 20 unchanged.

This will be specifically described below by comparing with a comparative example.

A sliding door structure in which a door main body is supported via three rails provided in a vehicle body is assumed as the comparative example. The three rails are respectively provided in, for example, the rocker 12, the roof side rail 15, and the below-window side section 19 of the kind shown in FIG. 16. On comparison, the sliding door structure S1 of the present embodiment and the sliding door structure according to the comparative example match in having the door main body 20 supported via three rails. However, in the sliding door structure S1 of the present embodiment, the door main body 20 is supported via two door rails 50H, 50L provided in the door main body 20, hence the number of rails provided in the vehicle body 10 can be reduced to the single vehicle body rail 30. When the number of rails provided in the vehicle body 10 is reduced, degree of freedom of design of the vehicle body 10 improves.

Moreover, due to there being the above kind of configuration, the door rail 50 and the vehicle body rail 30 both extend linearly, without it being necessary to provide a curved portion in the door rail 50 and the vehicle body rail 30 to cause the door main body 20 to separate from the vehicle body 10 and cause the door main body 20 to approach the vehicle body 10. Therefore, increase in thickness of the door main body 20 can be suppressed, and degree of freedom of design of the vehicle body 10 in a portion provided with the vehicle body rail 30 (the rocker 12 in the present embodiment) improves.

Moreover, in the sliding door structure S1 of the present embodiment, as shown in FIGS. 1 and 2, when the sliding door opens from the fully closed state, the vehicle body rail support member 40 rotates with respect to the vehicle body 10 around the vehicle body side end section 41 and the door rail support member 60 rotates with respect to the vehicle body 10 around the vehicle body side end section 61, with a position with respect to the vehicle body rail 30 of the vehicle body side end section 41 of the vehicle body rail support member 40 and a position with respect to the door rail 50 of the door side end section 62 of the door rail support member 60 remaining fixed. In addition, simultaneously to this, the vehicle body rail support member 40 rotates with respect to the door main body 20 around the door side end section 42 and the door rail support member 60 rotates with respect to the door main body 20 around the door side end section 62. As a result, the door main body 20 swings so as to separate to an outer side in the vehicle width direction from the vehicle body 10 with orientation of the door main body 20 held unchanged.

Moreover, as shown in FIGS. 2 to 4, after the door main body 20 has separated to a certain spacing from the vehicle body 10 by swinging of the door main body 20, the vehicle body side end section 41 of the vehicle body rail support member 40 moves along the vehicle body rail 30 and the door side end section 62 of the door rail support member 60 moves along the door rail 50, with an angle with respect to the vehicle body 10 of the vehicle body rail support member 40 and an angle with respect to the vehicle body 10 of the door rail support member 60 remaining fixed. As a result, the door main body 20 slides to the vehicle rear which is the door opening direction with respect to the vehicle body 10 with orientation of the door main body 20 held unchanged.

Moreover, in the sliding door structure S1 of the present embodiment, as shown in FIG. 2, the vehicle body rail support member 40 and the door rail support member 60 are directed in the vehicle width direction, in the boundary state where the swinging operation and the sliding operation switch. In other words, in a state where the door main body 20 has separated to a certain spacing from the vehicle body 10, the longitudinal directions of the vehicle body rail support member 40 and the door rail support member 60 are directed in a direction perpendicular to the door opening-closing direction. Therefore, the door main body 20 swings so as to separate from the vehicle body from the fully closed state, and at an instant that the door main body 20 has separated to a certain spacing from the vehicle body 10 (in other words, at an instant the boundary state has been attained), a movement direction of the door main body 20 matches a vehicle rear direction which is the door opening direction. Therefore, operation of the door main body 20 shifts smoothly from the swinging operation to the sliding operation. Moreover, shifting from the sliding operation to the swinging operation when closing the sliding door also becomes smooth. Hence, a smooth door opening-closing operation is enabled.

Moreover, in the sliding door structure S1 of the present embodiment, as shown in FIGS. 9 and 10, the column section 33 is provided in an end section on the door closing direction side (vehicle front side) of the vehicle body rail 30, and the opening 44 is provided in the vehicle body side end section 41 of the vehicle body rail support member 40.

Moreover, as shown in FIG. 10A, in the fully closed state, by the column section 33 penetrating the opening 44, the column section 33 is positioned in a center of rotation with respect to the vehicle body 10 of the vehicle body rail support member 40. Moreover, in the fully closed state, the opening direction A of the opening 44 is directed in a direction inclined to the vehicle inner side (an inner side in the vehicle width direction) with respect to the door closing direction (the vehicle front direction).

When the sliding door opens from the fully closed state, the vehicle body rail support member 40 rotates with respect to the vehicle body 10 around the column section 33, with a state of the column section 33 penetrating the opening 44 unchanged. Moreover, when the sliding door opens from the fully closed state, until the opening direction A matches the door closing direction (vehicle front direction), the vehicle body side end section 41 of the vehicle body rail support member 40 receives a reaction force in the door closing direction from the column section 33 penetrating the opening 44, whereby movement in the door opening direction along the vehicle body rail 30 of the vehicle body side end section 41 of the vehicle body rail support member 40 is restricted.

As a result, when the sliding door opens from the fully closed state, first, operation of the door main body 20 is limited to the swinging operation only.

Then, when the vehicle body rail support member 40 continues rotation with respect to the vehicle body 10, the opening direction A of the opening 44 provided in the vehicle body side end section 41 of the vehicle body rail support member 40 matches the door closing direction (vehicle front direction) (refer to FIG. 10B). When the opening direction A matches the door closing direction, the vehicle body side end section 41 of the vehicle body rail support member 40 ceases to receive the reaction force in the door closing direction from the column section 33 penetrating the opening 44, whereby restriction of movement in the door opening direction along the vehicle body rail 30 of the vehicle body side end section 41 of the vehicle body rail support member 40 is released. As a result, the sliding operation of the door main body 20 is allowed.

Moreover, in the sliding door structure S1 of the present embodiment, the rotation restricting rail 32 extending linearly in the door opening-closing direction (the vehicle front-rear direction) is provided in the vehicle body 10, and the three vertical axis rollers 43B acting as the "rotation restricting rail abutting section" are provided in the vehicle body side end section 41 of the front side vehicle body rail support member 40F.

Moreover, in the sliding operation state, at least in a state close to the fully open state, the vertical axis rollers 43B abut on the rotation restricting rail 32, whereby rotation with respect to the vehicle body rail sliding member 71 of the front side vehicle body rail support member 40F is restricted, and as a result, rotation with respect to the vehicle body 10 of the front side vehicle body rail support member 40F is restricted. Moreover, when closing the sliding door from the fully open state, the vehicle body side end section 41 of the vehicle body rail support member 40 moves to the vehicle front which is the door closing direction along the vehicle body rail 30, and the vertical axis rollers 43B reach an end section on a door closing direction side (vehicle front side) of the rotation restricting rail 32, whereby restriction of rotation with respect to the vehicle body 10 of the vehicle body rail support member 40 is released.

Moreover, in the sliding door structure S1 of the present embodiment, as shown in FIGS. 15A to 15D, the vehicle body side winding roller 91 is attached to the vehicle body side end section 61 of the upper side door rail support member 60H, and the door side winding roller 92 is attached to the door side end section 62 of the upper side door rail support member 60H. Moreover, the first wire 93 is provided, and one end of the first wire 93 is fixed to an end section on a door closing direction side (vehicle front side) of the upper side door rail 50H. Moreover, the first wire 93 is wound at its middle section on the door side winding roller 92. Moreover, the second wire 94 is provided, and one end of the second wire 94 is fixed to an end section on a door opening direction side (vehicle rear side) of the upper side door rail 50H. Moreover, the second wire 94 is wound at its middle section on the door side winding roller 92. Moreover, the another end side of the first wire 93 and the another end side of the second wire 94 are connected to the motor 95 provided in the vehicle body 10. The above kind of configuration makes it possible to simultaneously generate a force causing the door main body 20 to undergo the swinging operation and a force causing the door main body 20 to undergo the sliding operation, by the motor 95. Hence, a drive mechanism of the door main body 20 can be simply achieved. Moreover, because the motor 95 is provided in the vehicle body 10, increase in weight of the sliding door can be suppressed.

Moreover, in the sliding door structure S1 of the present embodiment, the lower side door rail 50L acting as a "second door rail" extending linearly in the door opening-closing direction is provided at a different position in the up-down direction from the upper side door rail 50H in the door main body 20. The door side end section 62 of the lower side door rail support member 60L acting as a "second door rail support member" is coupled to the lower side door rail 50L, so as to be movable along the lower side door rail 50L. Moreover, the vehicle body side end section 61 of the lower side door rail support member 60L is coupled to the vehicle body 10. Furthermore, the lower side door rail support member 60L is rotatable with respect to the door main body 20 around the door side end section 62 and is rotatable with respect to the vehicle body 10 around the vehicle body side end section 61. As a result, the door main body 20 is supported capably of undergoing the swinging operation and the sliding operation with respect to the vehicle body 10, via these lower side door rail 50L and lower side door rail support member 60L.

Furthermore, as shown in FIG. 13, the door side end section 62 of the upper side door rail support member 60H and the door side end section 62 of the lower side door rail support member 60L are coupled in the up-down direction by the up-down coupling member 76. Therefore, operations of the upper side door rail support member 60H and the lower side door rail support member 60L are linked, hence operation of the door main body 20 can be even more stabilized.

Moreover, in the sliding door structure S1 of the present embodiment, the rear side vehicle body rail support member 40R acting as a "second vehicle body rail support member" is provided in addition to the front side vehicle body rail support member 40F. The rear side vehicle body rail support member 40R, similarly to the front side vehicle body rail support member 40F, is a member configured including: the vehicle body side end section 41 coupled to the vehicle body rail 30 and capable of moving along the vehicle body rail 30; and the door side end section 42 coupled to the door main body 20, and is rotatable with respect to the vehicle body 10 around the vehicle body side end section 41 and rotatable with respect to the door main body 20 around the door side end section 42. A position where the door side end section 42 of the rear side vehicle body rail support member 40R is coupled is a position more to a door opening direction side than a position where the door side end section 42 of the front side vehicle body rail support member 40F in the door main body 20 is coupled.

Furthermore, as shown in FIG. 8, the front-rear coupling member 75 is provided, and the vehicle body side end section 41 of the front side vehicle body rail support member 40F and the vehicle body side end section 41 of the rear side vehicle body rail support member 40R are coupled in the door opening-closing direction by the front-rear coupling member 75.

Therefore, operations of the front side vehicle body rail support member 40F and the rear side vehicle body rail support member 40R are linked, hence operation of the door main body 20 can be even more stabilized.

Moreover, in the sliding door structure S1 of the present embodiment, a position where the door side end section 42 of the front side vehicle body rail support member 40F is coupled to the door main body 20 is more to a door closing direction side (vehicle front side) than the center-of-gravity position G of the door. Moreover, as shown in FIGS. 4 and 5, a position of the door side end section 62 of the door rail support member 60 in the fully open state is more to a door closing direction side (vehicle front side) than the center-of-gravity position G of the door. In other words, as shown in FIGS. 4 and 5, in the fully open state, the door side end section 42 of the vehicle body rail support member 40 and the door side end section 62 of the door rail support member 60 are both positioned more to a door closing direction side (vehicle front side) than the center-of-gravity position G of the door. Therefore, in the fully open state, the vehicle body rail support member 40 and the door rail support member 60 are in a state of supporting the door main body 20 only on a door closing direction side (vehicle front side) with respect to the center-of-gravity position G of the door. When the door main body 20 is supported only on a door closing direction side with respect to the center-of-gravity position G of the door, it is easy for the door main body 20 to incline such that a door opening direction side (vehicle rear side) of the door main body 20 drops, due to own weight of the door main body 20.

Furthermore, as shown in FIG. 4, the position of the door side end section 62 of the door rail support member 60 in the fully open state is more to a door opening direction side (vehicle rear side) than a position where the door side end section 42 of the front side vehicle body rail support member 40F is coupled to the door main body 20. Therefore, when the door main body 20 inclines as mentioned above, a force to a vehicle upper side acts on the door side end section 42 of the front side vehicle body rail support member 40F (refer to arrow F1 of FIG. 12A).

Accordingly, in the sliding door structure S1 of the present embodiment, the horizontal axis roller 43C acting as the "reaction force generating section" is provided in the front side vehicle body rail support member 40F, and the upper wall 30H of the vehicle body rail 30 acting as the "inclination suppressing wall" is provided in the vehicle body 10. Moreover, in the fully open state as shown in FIG. 12A, the horizontal axis roller 43C is configured to abut, from the vehicle lower side, on the upper wall 30H of the vehicle body rail 30, whereby a force to the vehicle lower side acts on a vicinity of the front end of the door main body 20, via the upper wall 30H of the vehicle body rail 30, the horizontal axis roller 43C, and the front side vehicle body rail support member 40F, from the vehicle body 10. In other words, a reaction force (arrow F2) is configured to be generated with respect to the force indicated by the arrow F1 of FIG. 12A. Therefore, inclination of the door main body 20 such that the door opening direction side (vehicle rear side) of the door main body 20 drops, is suppressed.

Moreover, in the sliding door structure S1 of the present embodiment, even in the fully open state, the front side vehicle body rail support member 40F is positioned more to the vehicle front side than the door side end section 62 of the upper side door rail support member 60H or the door side end section 62 of the lower side door rail support member 60L. Moreover, as a result, even in the fully open state, the front side vehicle body rail support member 40F is positioned more to the vehicle front side than the up-down coupling member 76.

Because, in the fully open state, at least one of the vehicle body rail support members 40 is positioned more to the vehicle front side than the door side end sections 62 of the door rail support members 60 (or the up-down coupling member 76), rotation having as its axial direction substantially the up-down direction of the vehicle, of the door main body 20 is suppressed, even when the door has received a side wind in the fully open state.

Describing this point in detail, first, when the door receives a side wind in the fully open state, sometimes, the door main body 20 attempts to make a rotation having as its axial direction substantially the up-down direction of the vehicle, in a direction that a rear portion of the door main body 20 undergoes displacement to an inner side in the vehicle width direction. However, due to the vehicle body rail support member 40 positioned more to the vehicle front side than the door side end section 62 of the door rail support member 60 (or the up-down coupling member 76), a force suppressing the above-mentioned rotation (a force pulling a front portion of the door main body 20 to an inner side in the vehicle width direction) can be generated. Therefore, rotation having as its axial direction substantially the up-down direction of the vehicle, of the door main body 20 is suppressed.

[Supplementary Description of Above-Described Embodiment]

Note that in the above-described embodiment, a sliding door structure S1 where the door main body 20 opens by moving toward the vehicle rear side and the door main body 20 closes by moving toward the vehicle front side, was described. However, the present disclosure is not limited to this. For example, the present disclosure may be a sliding door structure where the door main body opens by moving toward the vehicle front side and the door main body closes by moving toward the vehicle rear side (in this case, the vehicle front corresponds to the "door opening direction" and the vehicle rear corresponds to the "door closing direction"), and moreover, the present disclosure may be a sliding door structure where the door main body opens by moving toward a vehicle right side in a rear end section of the vehicle and the door main body closes by moving toward a vehicle left side in the rear end section of the vehicle (in this case, a vehicle rightward direction corresponds to the "door opening direction" and a vehicle leftward direction corresponds to the "door closing direction").

Moreover, in the above-described embodiment, an example where the slide restricting mechanism M1 is configured so as to restrict movement along the vehicle body rail 30 of the front side vehicle body rail support member 40F, that is, an example where the slide restricting mechanism is configured including: the column section 33 provided in the end section on the door closing direction side (vehicle front side) of the vehicle body rail 30; and the opening 44 provided in the vehicle body side end section 41 of the front side vehicle body rail support member 40F, was described. However, the slide restricting mechanism is not limited to this, and may be, for example, a slide restricting mechanism that restricts movement along the door rail of the door rail support member. This case results in the slide restricting mechanism being configured including: a column section provided in the end section on the door opening direction side (vehicle rear side) of the door rail; and an opening provided in the door side end section of the door rail support member.

Moreover, in the above-described embodiment, an example where the solenoid type swing restricting mechanism M4 is applied to the upper side door rail support member 60H, and rotation with respect to the vehicle body 10 and the door main body 20 of the upper side door rail support member 60H is configured to be restricted, was described. However, the present disclosure is not limited to this. For example, the solenoid type swing restricting mechanism may be applied to the lower side door rail support member 60L, or may be applied to the vehicle body rail support member 40.

Moreover, in the above-described embodiment, an example where operation of the door main body 20 was separated into the swinging operation and the sliding operation by providing the slide restricting mechanism M1, the swing restricting mechanism M2, and the solenoid type swing restricting mechanism M4, was described. However, the present disclosure is not limited to this. A mechanism other than the mechanisms described in the above-described embodiment may be employed to separate the operation of the door main body 20 into the swinging operation and the sliding operation.

Moreover, in the above-described embodiment, an example configured such that, in a state that the door side end sections 62 of the door rail support members 60H, 60L are not positioned more to the vehicle front side than the center-of-gravity position G of the door (refer to FIG. 3), the upper wall 30H of the vehicle body rail 30 does not contact the horizontal axis roller 43C (refer to FIG. 12B), was described. However, the present disclosure is not limited to this. For example, there may be a configuration where, in the sliding operation state, the upper wall 30H of the vehicle body rail 30 always contacts the horizontal axis roller 43C.

Moreover, in the above-described embodiment, an example where the vehicle body rail 30 extends linearly in the vehicle front-rear direction and the door rail 50 extends linearly in the vehicle front-rear direction, was described. However, the present disclosure is not limited to this.

Figure 17A:
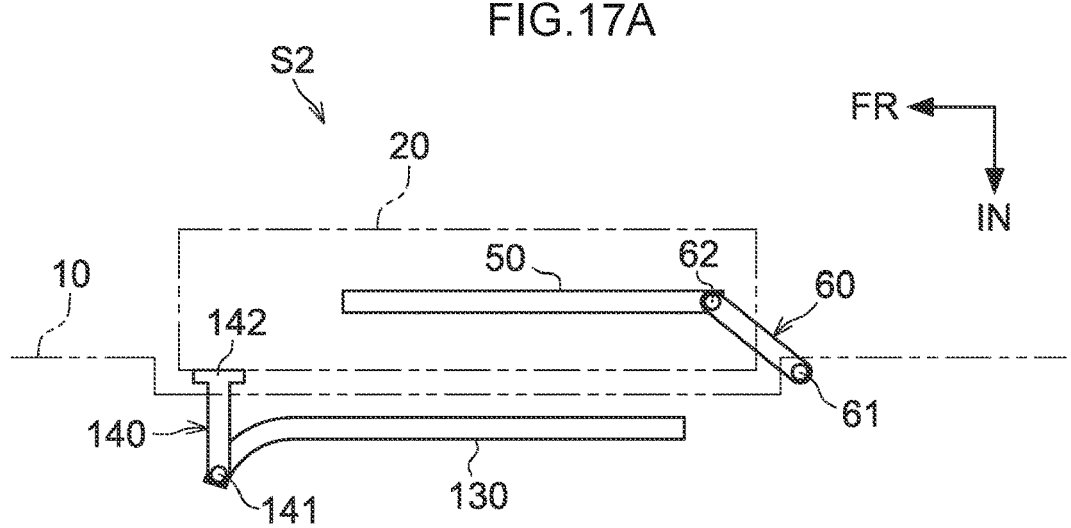
FIG. 17A is a schematic plan view showing a sliding door structure according to another embodiment.
Figure 17B:
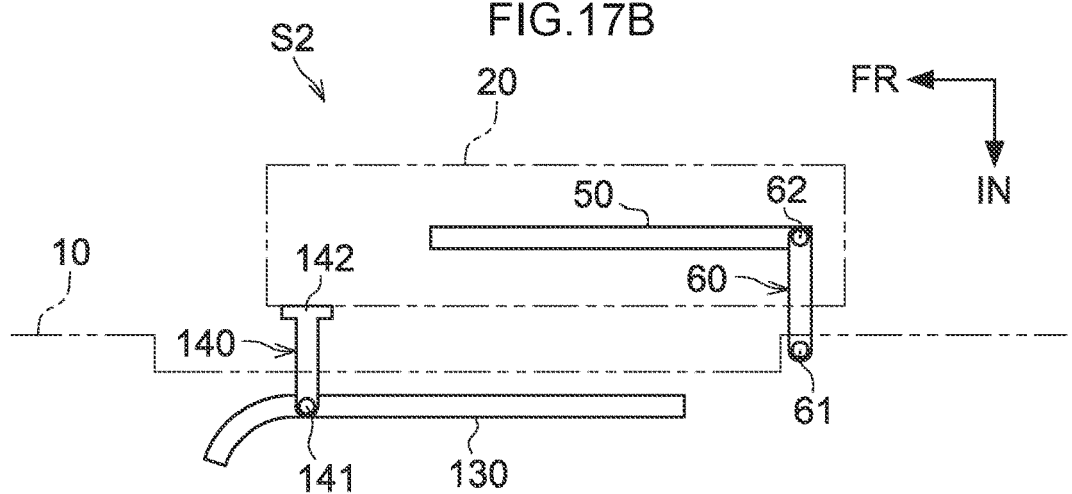
FIG. 17B is a schematic plan view showing the sliding door structure according to the another embodiment.
Figure 17C:
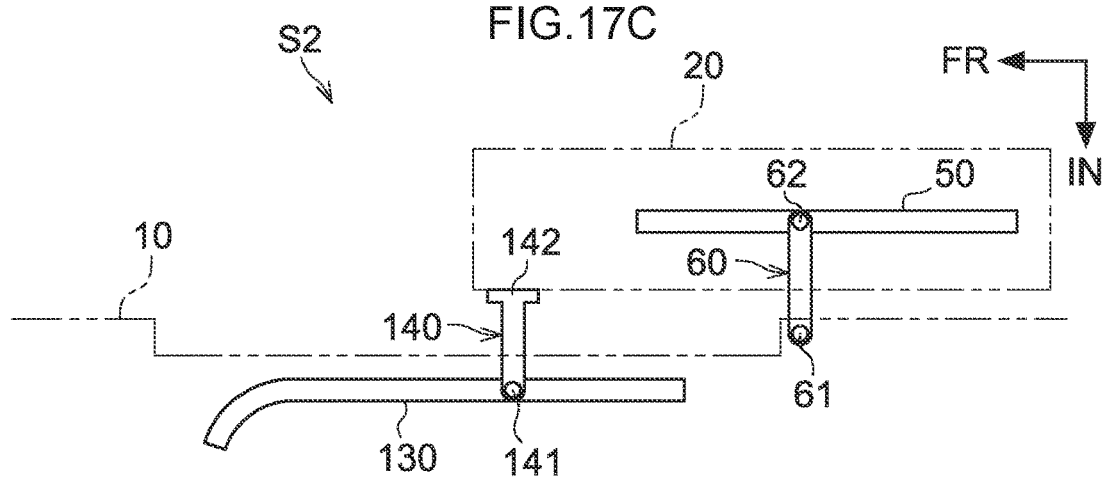
FIG. 17C is a schematic plan view showing the sliding door structure according to the another embodiment.
Figure 18A:
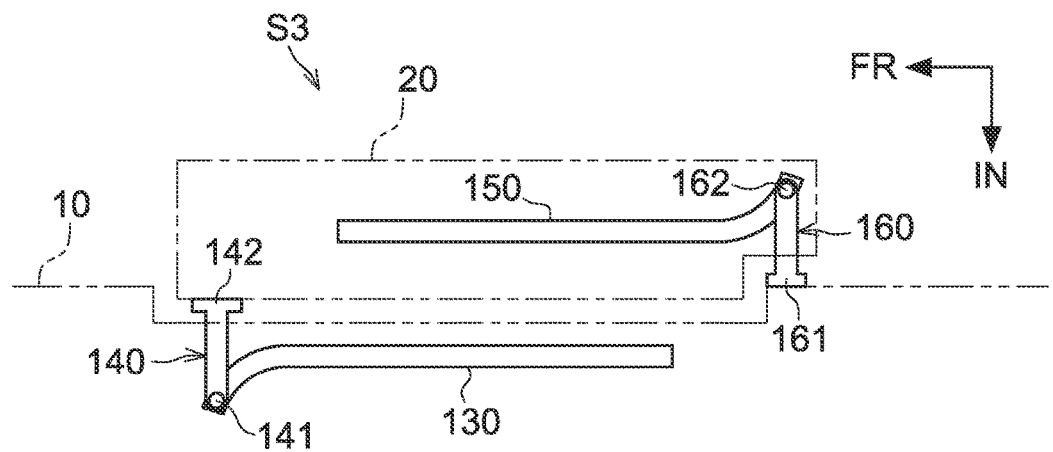
FIG. 18A is a schematic plan view showing a sliding door structure according to another embodiment.
Figure 18B:
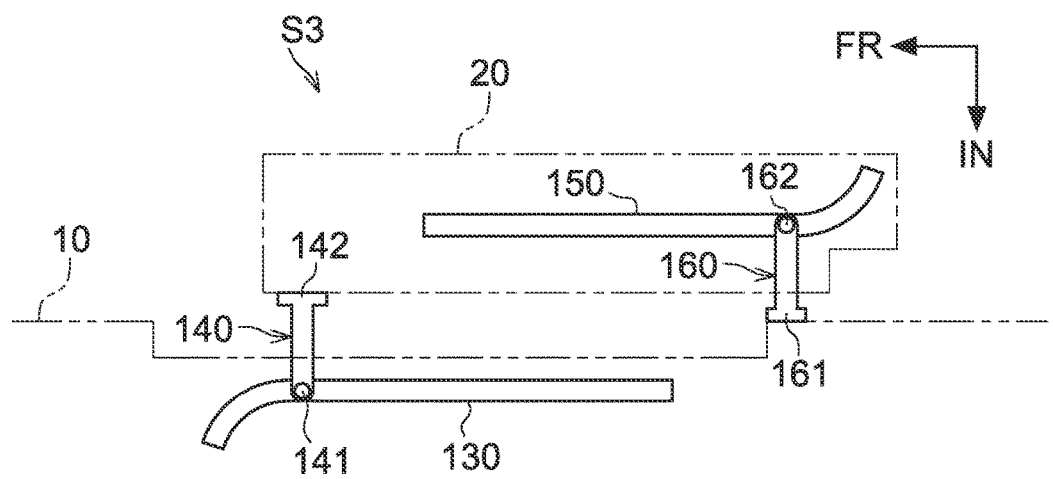
FIG. 18B is a schematic plan view showing the sliding door structure according to the another embodiment.
Figure 18C:
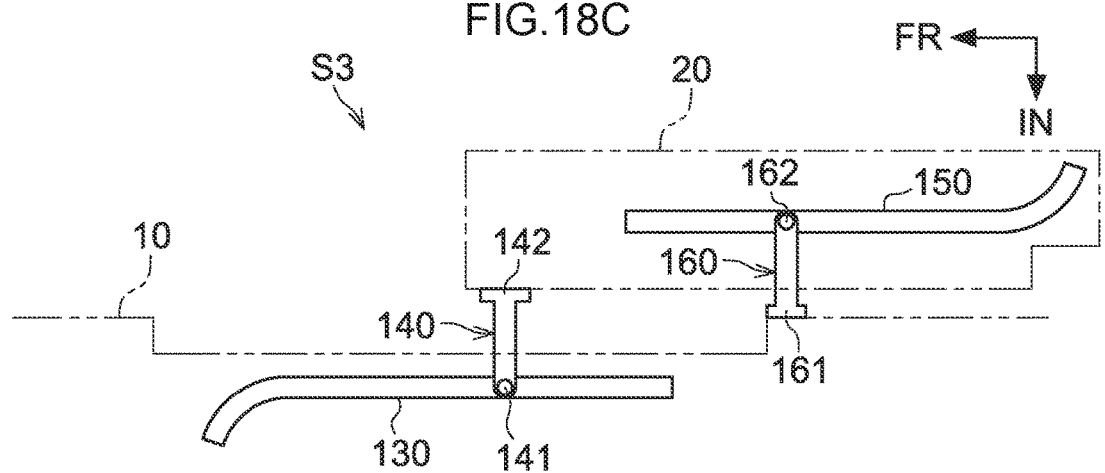
FIG. 18C is a schematic plan view showing the sliding door structure according to the another embodiment.

For example, as shown in FIGS. 17A to 17C, the present disclosure may be a sliding door structure S2 including a vehicle body rail 130 that on the whole is provided along the vehicle front-rear direction (door opening-closing direction) but whose end section on the vehicle front side (door closing direction side) is curved toward an inner side in the vehicle width direction (vehicle inner side). Moreover, for example, as shown in FIGS. 18A to 18C, the present disclosure may be a sliding door structure S3 including: the vehicle body rail 130 whose end section on the vehicle front side (door closing direction side) is curved toward an inner side in the vehicle width direction (vehicle inner side); and a door rail 150 whose end section on the vehicle rear side (door opening direction side) is curved toward a vehicle outer side (outer side in the vehicle width direction).

In the sliding door structure S2, a door side end section 142 of a vehicle body rail coupling member 140 is configured incapable of rotating with respect to the door main body 20. On the other hand, a vehicle body side end section 141 of the vehicle body rail coupling member 140 is configured to be movable along the vehicle body rail 130, and the door main body 20 is configured to approach or separate from the vehicle body 10 by the end section on the vehicle front side of this vehicle body rail 130 being curved toward an inner side in the vehicle width direction.

In the sliding door structure S3, a vehicle body side end section 161 of a door rail support member 160 is configured incapable of rotating with respect to the vehicle body 10. On the other hand, a door side end section 162 of the door rail support member 160 is configured to be movable along the door rail 150, and the door main body 20 is configured to approach or separate from the vehicle body 10 by the end section on the vehicle rear side of this door rail 150 being curved toward an outer side in the vehicle width direction.

In the fully open state, in both of the sliding door structure S2 and the sliding door structure S3, the door side end section 62, 162 of the door rail coupling member 60, 160 is positioned in the end section on the vehicle front side of the door rail 50, 150. As a result, in the fully open state, both of the vehicle body rail support member 140 and the door rail support member 60, 160 are in a state of supporting the door main body 20 at a position more to the vehicle front than the center-of-gravity position G of the door. Furthermore, a position where the door side end section 142 of the vehicle body rail support member 140 is coupled to the door main body 20 is a vicinity of the front end of the door main body 20 and is even more to the vehicle front side than the end section on the vehicle front side of the door rail 50, 150. Therefore, in the fully open state, it is easy for the end section on the vehicle rear side of the door main body 20 to incline so as to drop due to own weight of the door main body 20, and a force to the vehicle upper side acts on the door side end section 142 of the vehicle body rail support member 140. This is similar to in the above-mentioned sliding door structure S1.

Moreover, the sliding door structure S2 and the sliding door structure S3 also have the "reaction force generating section" provided in the vehicle body rail support member 140 and the "inclination suppressing wall" provided in the vehicle body 10, similarly to the sliding door structure S1. The inclination suppressing wall is configured so as to be abutted on from the vehicle lower side by the reaction force generating section of the vehicle body rail support member 140 in a state where the position of the door side end section 62, 162 of the door rail support member 60, 160 is positioned more to the vehicle front side than the center-of-gravity position G of the door. Therefore, in a state where a support point of the door main body 20 is inclined to the vehicle front side, the "reaction force generating section" of the vehicle body rail support member 140 receives a reaction force from the inclination suppressing wall. Hence, inclination of the door main body 20 is suppressed.

A sliding door structure of a first aspect includes: a door main body; a vehicle body rail provided along a door opening-closing direction in a vehicle body; a vehicle body rail support member configured including: a vehicle body side end section coupled to the vehicle body rail and movable along the vehicle body rail; and a door side end section coupled to the door main body; a door rail provided along the door opening-closing direction in the door main body; and a door rail support member configured including: a door side end section coupled to the door rail and movable along the door rail; and a vehicle body side end section coupled to the vehicle body, a position where the door side end section of the vehicle body rail support member is coupled to the door main body being more to a door closing direction side than a center-of-gravity position of a door, and a position of the door side end section of the door rail support member in a fully open state being more to the door closing direction side than the center-of-gravity position of the door and more to a door opening direction side than a position where the door side end section of the vehicle body rail support member is coupled to the door main body, and the sliding door structure further including: a reaction force generating section provided in the vehicle body rail support member; and an inclination suppressing wall provided in the vehicle body and configured so as to be abutted on from a vehicle lower side by the reaction force generating section at least in the fully open state.

A "center-of-gravity position of a door" means a center-of-gravity position with respect to an entire door including not only a door main body but also a door rail, that is, a center-of-gravity position with respect to an entirety of members supported by a vehicle body via a vehicle body rail support member and a door rail support member (not including the vehicle body rail support member and the door rail support member).

In the sliding door structure of the first aspect, a vehicle body rail is provided in a vehicle body, and a vehicle body side end section of a vehicle body rail support member is coupled to the vehicle body rail. Moreover, a door side end section of the vehicle body rail support member is coupled to a door main body. In addition, a door rail is provided in the door main body, and a door side end section of a door rail support member is coupled to the door rail. Moreover, a vehicle body side end section of the door rail support member is coupled to a vehicle body. As a result, the door main body is supported by the vehicle body.

In addition, the vehicle body side end section of the vehicle body rail support member is movable along the vehicle body rail, and the door side end section of the door rail support member is movable along the door rail.

Therefore, by the vehicle body side end section of the vehicle body rail support member moving in a door opening direction with respect to the vehicle body and the door side end section of the door rail support member moving in a door closing direction with respect to the door main body, a sliding door opens. On the other hand, by the vehicle body side end section of the vehicle body rail support member moving in the door closing direction with respect to the vehicle body and the door side end section of the door rail support member moving in the door opening direction with respect to the door main body, the sliding door closes.

In addition, a position where the door side end section of the vehicle body rail support member is coupled to the door main body is more to a door closing direction side than the center-of-gravity position of the door. Moreover, a position of the door side end section of the door rail support member in a fully open state is more to the door closing direction side than the center-of-gravity position of the door. In other words, in the fully open state, the door side end section of the vehicle body rail support member and the door side end section of the door rail support member are both positioned more to the door closing direction side than the center-of-gravity position of the door. Therefore, in the fully open state, the vehicle body rail support member and the door rail support member are in a state of supporting the door main body only on the door closing direction side with respect to the center-of-gravity position of the door. Therefore, due to own weight of the door main body, it is easy for the door main body to incline such that an end section on the door opening direction side of the door main body drops.

Furthermore, the position of the door side end section of the door rail support member in the fully open state is more to a door opening direction side than a position where the door side end section of the vehicle body rail support member is coupled to the door main body. Therefore, when the door main body inclines as mentioned above, a force to a vehicle upper side acts on the door side end section of the vehicle body rail support member.

Accordingly, in the sliding door structure of the first aspect, a reaction force generating section is provided in the vehicle body rail support member, and an inclination suppressing wall is provided in the vehicle body. The inclination suppressing wall is configured so as to be abutted on from a vehicle lower side by the reaction force generating section of the vehicle body rail support member at least in the fully open state.

Therefore, at least in the fully open state, when the door main body is about to incline as mentioned above, the reaction force generating section of the vehicle body rail support member abuts from the vehicle lower side on the inclination suppressing wall, and receives a reaction force to the vehicle lower side. Therefore, inclination of the door main body is suppressed.

A sliding door structure of a second aspect is the sliding door structure of the first aspect, wherein the reaction force generating section is a roller whose axial direction is directed in a direction perpendicular to the door opening-closing direction and a vehicle up-down direction in the fully open state.

In the sliding door structure of the second aspect, the reaction force generating section is a roller whose axial direction is directed in a direction perpendicular to the door opening-closing direction and a vehicle up-down direction in the fully open state. Therefore, in a state where the reaction force generating section is abutting on the inclination suppressing wall, resistance to an opening/closing operation of the sliding door can be reduced.

A sliding door structure of a third aspect is the sliding door structure of the first aspect or the second aspect, wherein the inclination suppressing wall is configured so as to be abutted on from the vehicle lower side by the reaction force generating section at least in a state where a position of the door side end section of the door rail support member is positioned more to the door closing direction side than the center-of-gravity position of the door.

In the sliding door structure of the third aspect, the inclination suppressing wall is configured so as to be abutted on from the vehicle lower side by the reaction force generating section at least in a state where a position of the door side end section of the door rail support member is positioned more to the door closing direction side than the center-of-gravity position of the door.

Therefore, it is configured such that in a state where both the vehicle body rail support member and the door rail support member are supporting the door main body only on the door closing direction side with respect to the center-of-gravity position of the door, the reaction force generating section receives a reaction force from the inclination suppressing wall. Therefore, inclination of the door main body is effectively suppressed.

As described above, the sliding door structure according to the present disclosure has an excellent effect that inclination of a door main body in a fully open state can be suppressed.

What is claimed is:

1. A sliding door structure, comprising:
   a door main body;
   a vehicle body rail provided, at a vehicle body, along a door opening-closing direction;
   a vehicle body rail support member configured to include:
      a vehicle body side end-section coupled to the vehicle body rail and configured to move along the vehicle body rail; and a door side end-section coupled to the door main body;
   a door rail provided, at the door main body, along the door opening-closing direction; and
   a door rail support member configured to include: the door side end-section coupled to the door rail and configured to move along the door rail; and the vehicle body side end-section coupled to the vehicle body,
   a position where the door side end-section of the vehicle body rail support member is coupled to the door main body being further to a door closing direction side than a center-of-gravity position of a door, and
   a position of the door side end-section of the door rail support member in a fully open state being further to the door closing direction side than the center-of-gravity position of the door and further to a door opening direction side than a position where the door side end-section of the vehicle body rail support member is coupled to the door main body, and
   the sliding door structure further comprising:
   a reaction force generating section provided at the vehicle body rail support member; and
   an inclination suppressing wall provided at the vehicle body and configured so as to be abutted, from a vehicle lower side, by the reaction force generating section at least in the fully open state.

2. The sliding door structure according to claim 1, wherein:
   the reaction force generating section is a roller having an axial direction that is directed in a direction perpendicular to the door opening-closing direction and a vehicle up-down direction in the fully open state.

3. The sliding door structure according to claim 1, wherein
   the inclination suppressing wall is configured so as to be abutted, from the vehicle lower side, by the reaction force generating section at least in a state in which a position of the door side end-section of the door rail support member is positioned further to the door closing direction side than the center-of-gravity position of the door.

4. The sliding door structure according to claim 1, wherein
   the door opening direction is to a vehicle front, and the door closing direction is to a vehicle rear, or
   the door opening direction is to the vehicle rear, and the door closing direction is to the vehicle front, or
   the door opening direction is a vehicle rightward direction, and the door closing direction is a leftward direction, or
   the door opening direction is the vehicle leftward direction, and the door closing direction is the rightward direction.

5. The sliding door structure according to claim 1, wherein
   the vehicle body rail extends linearly in the door opening-closing direction, and the door rail extends in the door opening-closing direction, or
   the vehicle body rail is, in its entirety, provided along the door opening-closing direction and has its end-section on the door closing direction side curved toward a vehicle inner side, and the door rail extends in the door opening-closing direction, or
   the vehicle body rail is, in its entirety, provided along the door opening-closing direction and has its end-section on the door closing direction side curved toward the vehicle inner side, and the door rail is, in its entirety, provided along the door opening-closing direction and has its end-section on the door opening direction side curved toward a vehicle outer side.

6. The sliding door structure according to claim 1, wherein
the reaction force generating section is fixed to the vehicle body side end section of the vehicle body rail support member.

* * * * *